US012621416B2

(12) United States Patent
Yoneyama

(10) Patent No.: US 12,621,416 B2
(45) Date of Patent: May 5, 2026

(54) PROJECTION IMAGE ADJUSTMENT METHOD, INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Takuo Yoneyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 228 days.

(21) Appl. No.: 18/621,521

(22) Filed: Mar. 29, 2024

(65) Prior Publication Data

US 2024/0333892 A1 Oct. 3, 2024

(30) Foreign Application Priority Data

Mar. 30, 2023 (JP) ................................. 2023-054896

(51) Int. Cl.
*H04N 9/31* (2006.01)
*G06T 7/70* (2017.01)

(52) U.S. Cl.
CPC ............. *H04N 9/3179* (2013.01); *G06T 7/70* (2017.01); *H04N 9/3147* (2013.01)

(58) Field of Classification Search
None
See application file for complete search history.

(56) References Cited

U.S. PATENT DOCUMENTS 10,210,607 B1 * 2/2019 Weinschenk ......... H04N 9/3194
2002/0024640 A1 2/2002 Ioka
(Continued)

FOREIGN PATENT DOCUMENTS

JP 2002-072359 A 3/2002
JP 2011-182076 A 9/2011
(Continued)

OTHER PUBLICATIONS

Meiji University_Autocorrelation Method: "Autocorrelation Method", Meiji University, Jun. 20, 2022.
(Continued)

*Primary Examiner* — Samira Monshi
(74) *Attorney, Agent, or Firm* — Oliff PLC

(57) ABSTRACT

A projection image adjustment method includes acquiring first captured image by capturing image of first image projected at first position on projection surface and second image projected at second position on projection surface and at least partially overlapping with first image, acquiring first amount of shift between first image and second image based on first captured image, moving first image from first position to third position separate therefrom in first direction, acquiring second captured image by capturing image of first image projected at third position and second image projected at second position, acquiring second amount of shift between first image and second image based on second captured image, and moving second image from second position to a fourth position separate therefrom in a second direction that is the opposite direction of the first direction when the second amount of shift is smaller than the first amount of shift.

10 Claims, 9 Drawing Sheets

(56)  References Cited

U.S. PATENT DOCUMENTS

| | | | |
|---|---|---|---|
| 2011/0211065 A1 | 9/2011 | Furui | |
| 2015/0237317 A1* | 8/2015 | Ehara | H04N 23/698 |
| | | | 348/745 |
| 2016/0112689 A1* | 4/2016 | Okamoto | H04N 9/3179 |
| | | | 348/745 |
| 2019/0110032 A1* | 4/2019 | Someya | H04N 9/3194 |
| 2019/0327457 A1* | 10/2019 | Urano | H04N 9/3194 |
| 2020/0193568 A1* | 6/2020 | Aoyanagi | H04N 9/3182 |
| 2021/0302810 A1 | 9/2021 | Kinoshita | |
| 2022/0353480 A1* | 11/2022 | Wang | H04N 9/317 |
| 2023/0039541 A1* | 2/2023 | Kashiwagi | G09G 3/20 |
| 2024/0214531 A1* | 6/2024 | Itagaki | G09G 5/00 |

FOREIGN PATENT DOCUMENTS

| | | |
|---|---|---|
| JP | 2021-061510 A | 4/2021 |
| JP | 2021-114685 A | 8/2021 |
| JP | 2021-157056 A | 10/2021 |

OTHER PUBLICATIONS

"Fourier Transform of Trigonometric Function", ninjin&natsu, Jun. 20, 2022.

* cited by examiner

Figure 4:
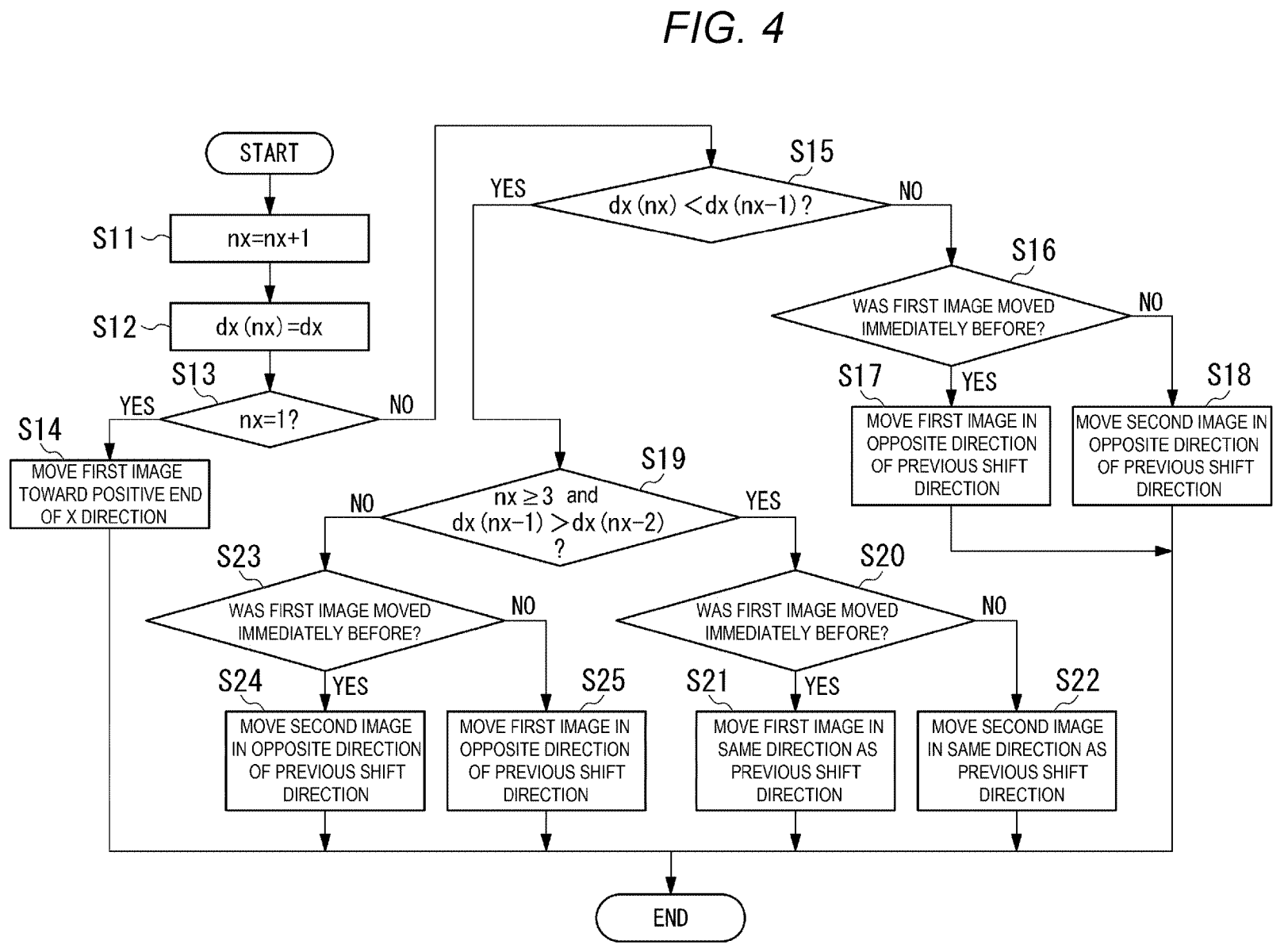

START

S11: nx=nx+1

S12: dx(nx)=dx

S13: nx=1?
- YES → S14: MOVE FIRST IMAGE TOWARD POSITIVE END OF X DIRECTION
- NO → S15: dx(nx) < dx(nx−1)?

S15: dx(nx) < dx(nx−1)?
- YES → S16: WAS FIRST IMAGE MOVED IMMEDIATELY BEFORE?
  - YES → S17: MOVE FIRST IMAGE IN OPPOSITE DIRECTION OF PREVIOUS SHIFT DIRECTION
  - NO → S18: MOVE SECOND IMAGE IN OPPOSITE DIRECTION OF PREVIOUS SHIFT DIRECTION
- NO → S19: nx ≥ 3 and dx(nx−1) > dx(nx−2)?

S19: nx ≥ 3 and dx(nx−1) > dx(nx−2)?
- YES → S20: WAS FIRST IMAGE MOVED IMMEDIATELY BEFORE?
  - YES → S21: MOVE FIRST IMAGE IN SAME DIRECTION AS PREVIOUS SHIFT DIRECTION
  - NO → S22: MOVE SECOND IMAGE IN SAME DIRECTION AS PREVIOUS SHIFT DIRECTION
- NO → S23: WAS FIRST IMAGE MOVED IMMEDIATELY BEFORE?
  - YES → S24: MOVE SECOND IMAGE IN OPPOSITE DIRECTION OF PREVIOUS SHIFT DIRECTION
  - NO → S25: MOVE FIRST IMAGE IN OPPOSITE DIRECTION OF PREVIOUS SHIFT DIRECTION

END

*FIG. 5*

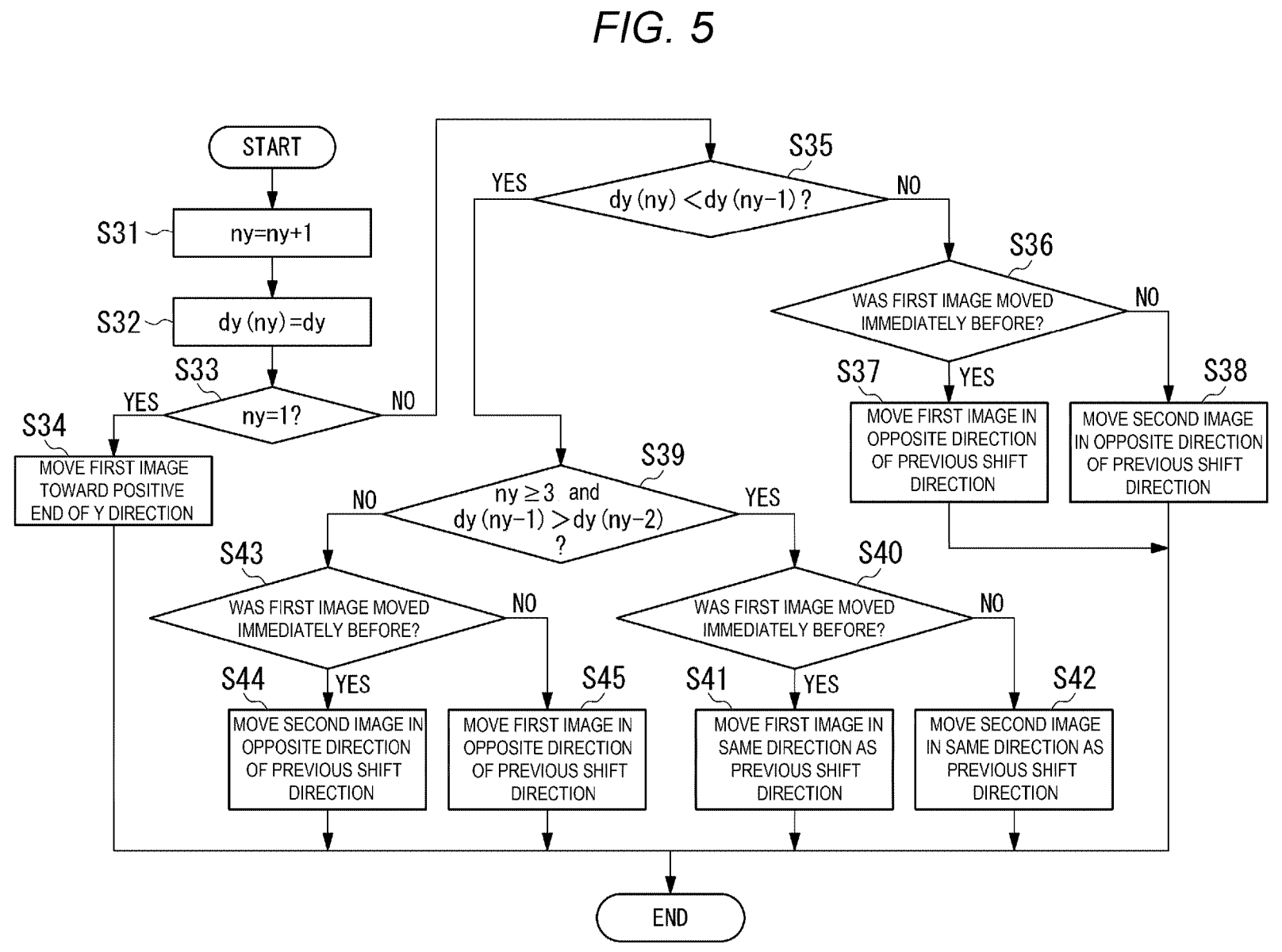

START

S31 — ny=ny+1

S32 — dy (ny) =dy

S33 — ny=1 ?

YES

S34 — MOVE FIRST IMAGE TOWARD POSITIVE END OF Y DIRECTION

NO

S35 — dy (ny) < dy (ny−1) ?

YES

NO

S36 — WAS FIRST IMAGE MOVED IMMEDIATELY BEFORE?

NO

S38 — MOVE SECOND IMAGE IN OPPOSITE DIRECTION OF PREVIOUS SHIFT DIRECTION

YES

S37 — MOVE FIRST IMAGE IN OPPOSITE DIRECTION OF PREVIOUS SHIFT DIRECTION

S39 — ny ≥ 3, and dy (ny−1) > dy (ny−2) ?

YES

S40 — WAS FIRST IMAGE MOVED IMMEDIATELY BEFORE?

NO

S42 — MOVE SECOND IMAGE IN SAME DIRECTION AS PREVIOUS SHIFT DIRECTION

YES

S41 — MOVE FIRST IMAGE IN SAME DIRECTION AS PREVIOUS SHIFT DIRECTION

NO

S43 — WAS FIRST IMAGE MOVED IMMEDIATELY BEFORE?

NO

S45 — MOVE FIRST IMAGE IN OPPOSITE DIRECTION OF PREVIOUS SHIFT DIRECTION

YES

S44 — MOVE SECOND IMAGE IN OPPOSITE DIRECTION OF PREVIOUS SHIFT DIRECTION

END

| Ct | dx (mm) | nx | dy (mm) | ny | REMARKS |
|----|---------|----|---------|----|---------|
| 1 | 1. 8 | 1 | 0 | 0 | A, +X |
| 2 | 1. 3 | 2 | 0 | 0 | B, −X |
| 3 | 0. 8 | 3 | 0 | 0 | A, +X |
| 4 | 0. 3 | 3 | 0 | 0 | − |

| Ct | dx (mm) | nx | dy (mm) | ny | REMARKS |
|----|---------|----|---------|----|---------|
| 1 | 1. 8 | 1 | 0 | 0 | A, +X |
| 2 | 2. 3 | 2 | 0 | 0 | A, −X |
| 3 | 1. 8 | 3 | 0 | 0 | A, −X |
| 4 | 1. 3 | 4 | 0 | 0 | B, +X |
| 5 | 0. 8 | 5 | 0 | 0 | A, −X |
| 6 | 0. 3 | 5 | 0 | 0 | − |

| Ct | dx (mm) | nx | dy (mm) | ny | REMARKS |
|----|---------|-----|---------|-----|---------|
| 1 | 2.4 | 1 | 1.3 | 0 | A, +X |
| 2 | 2.9 | 2 | 1.3 | 0 | A, −X |
| 3 | 2.4 | 3 | 1.3 | 0 | A, −X |
| 4 | 1.9 | 4 | 1.3 | 0 | B, +X |
| 5 | 1.4 | 5 | 1.3 | 0 | A, −X |
| 6 | 0.9 | 5 | 1.3 | 1 | A, +Y |
| 7 | 0.9 | 5 | 1.8 | 2 | A, −Y |
| 8 | 0.9 | 5 | 1.3 | 3 | A, −Y |
| 9 | 0.9 | 6 | 0.8 | 3 | B, +X |
| 10 | 0.4 | 6 | 0.8 | 4 | B, +Y |
| 11 | 0.4 | 6 | 0.3 | 4 | − |

PROJECTION IMAGE ADJUSTMENT METHOD, INFORMATION PROCESSING APPARATUS, AND NON-TRANSITORY COMPUTER-READABLE STORAGE MEDIUM STORING PROGRAM

The present application is based on, and claims priority from JP Application Serial Number 2023-054896, filed Mar. 30, 2023, the disclosure of which is hereby incorporated by reference herein in its entirety.

BACKGROUND

1. Technical Field

The present disclosure relates to a projection image adjustment method, a projection system, an information processing apparatus, and a non-transitory computer-readable storage medium storing a program.

2. Related Art

JP-A-2021-061510 discloses a technology for detecting the amount and direction of pixel shift between a plurality of projection images projected by the plurality of projectors to overlap with each other. The technology includes capturing overlapping regions where a plurality of projection images overlap with each other to acquire captured images, applying two-dimensional Fourier transform to the captured images to produce frequency spectrum images, and detecting the amount and direction of pixel shift based on the frequency spectrum images.

JP-A-2021-061510 is an example of the related art.

The technology disclosed in JP-A-2021-061510 can detect the amount and direction of the relative pixel shift between the plurality of projection images, but cannot determine which projection image is shifted in which direction. In other words, the technology disclosed in JP-A-2021-061510 cannot detect the absolute pixel shift direction in each of the projection images. Furthermore, JP-A-2021-061510 does not specifically describe how to correct the pixel shift between the plurality of projection images only with the aid of the known amount and direction of the relative pixel shift. It is therefore difficult to correct the pixel shift between the plurality of projection images overlapping with each other based on the technical content disclosed in JP-A-2021-061510.

SUMMARY

A projection image adjustment method according to an aspect of the present disclosure includes acquiring a first captured image from a camera by causing the camera to capture an image of a projection surface with a first image projected by a first projector at a first position on the projection surface and a second image projected by a second projector at a second position on the projection surface and at least partially overlapping with the first image, acquiring, based on the first captured image, a first amount of shift along a first axis between the first image and the second image, the first axis being a coordinate axis of a global coordinate system, causing the first projector to move the first image from the first position to a third position separate therefrom by a first distance in a first direction corresponding to a direction toward one end of the first axis, acquiring a second captured image from the camera by causing the camera to capture an image of the projection surface with the first image projected by the first projector at the third position and the second image projected by the second projector at the second position, acquiring, based on the second captured image, a second amount of shift along the first axis between the first image and the second image, and causing the second projector to move the second image from the second position to a fourth position separate therefrom by a second distance in a second direction that is an opposite direction of the first direction when the second amount of shift is smaller than the first amount of shift.

A projection system according to another aspect of the present disclosure includes a first projector that projects a first image onto a projection surface, a second projector that projects a second image onto the projection surface, and a camera that captures an image of the projection surface, the first projector including a processing apparatus that acquires a first captured image from the camera by causing the camera to capture an image of the projection surface with the first image projected by the first projector at a first position on the projection surface and the second image projected by the second projector at a second position on the projection surface and at least partially overlapping with the first image, acquires, based on the first captured image, a first amount of shift along a first axis between the first image and the second image, the first axis being a coordinate axis of a global coordinate system, causes the first projector to move the first image from the first position to a third position separate therefrom by a first distance in a first direction corresponding to a direction toward one end of the first axis, acquires a second captured image from the camera by causing the camera to capture an image of the projection surface with the first image projected by the first projector at the third position and the second image projected by the second projector at the second position, acquires, based on the second captured image, a second amount of shift along the first axis between the first image and the second image, and causes the second projector to move the second image from the second position to a fourth position separate therefrom by a second distance in a second direction that is an opposite direction of the first direction when the second amount of shift is smaller than the first amount of shift.

An information processing apparatus according to another aspect of the present disclosure includes a processing apparatus that acquires a first captured image from a camera by causing the camera to capture an image of a projection surface with a first image projected by a first projector at a first position on the projection surface and a second image projected by a second projector at a second position on the projection surface and at least partially overlapping with the first image, acquires, based on the first captured image, a first amount of shift along a first axis between the first image and the second image, the first axis being a coordinate axis of a global coordinate system, causes the first projector to move the first image from the first position to a third position separate therefrom by a first distance in a first direction corresponding to a direction toward one end of the first axis, acquires a second captured image from the camera by causing the camera to capture an image of the projection surface with the first image projected by the first projector at the third position and the second image projected by the second projector at the second position, acquires, based on the second captured image, a second amount of shift along the first axis between the first image and the second image, and causes the second projector to move the second image from the second position to a fourth position separate therefrom by a second distance in a second direction that is an opposite direction of the first direction when the second amount of shift is smaller than the first amount of shift.

A non-transitory computer-readable storage medium storing a program according to another aspect of the present disclosure causes a computer to acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, cause the first projector to move the first image from the first position to a third position separate therefrom by a first distance in a first direction corresponding to a direction toward one end of the first axis, acquire a second captured image from the camera by causing the camera to capture an image of the projection surface with the first image projected by the first projector at the third position and the second image projected by the second projector at the second position, acquire, based on the second captured image, a second amount of shift along the first axis between the first image and the second image, and cause the second projector to move the second image from the second position to a fourth position separate therefrom by a second distance in a second direction that is an opposite direction of the first direction when the second amount of shift is smaller than the first amount of shift.

BRIEF DESCRIPTION OF THE DRAWINGS

FIG. 1 shows a schematic configuration of a projection system according to a first embodiment.

FIG. 2 is a block diagram showing a schematic configuration of a projector.

FIG. 4 is a flowchart showing X-axis correction.

FIG. 5 is a flowchart showing Y-axis correction.

FIG. 12 shows a schematic configuration of the projection system according to a second embodiment.

DESCRIPTION OF EMBODIMENTS

Figure 3:
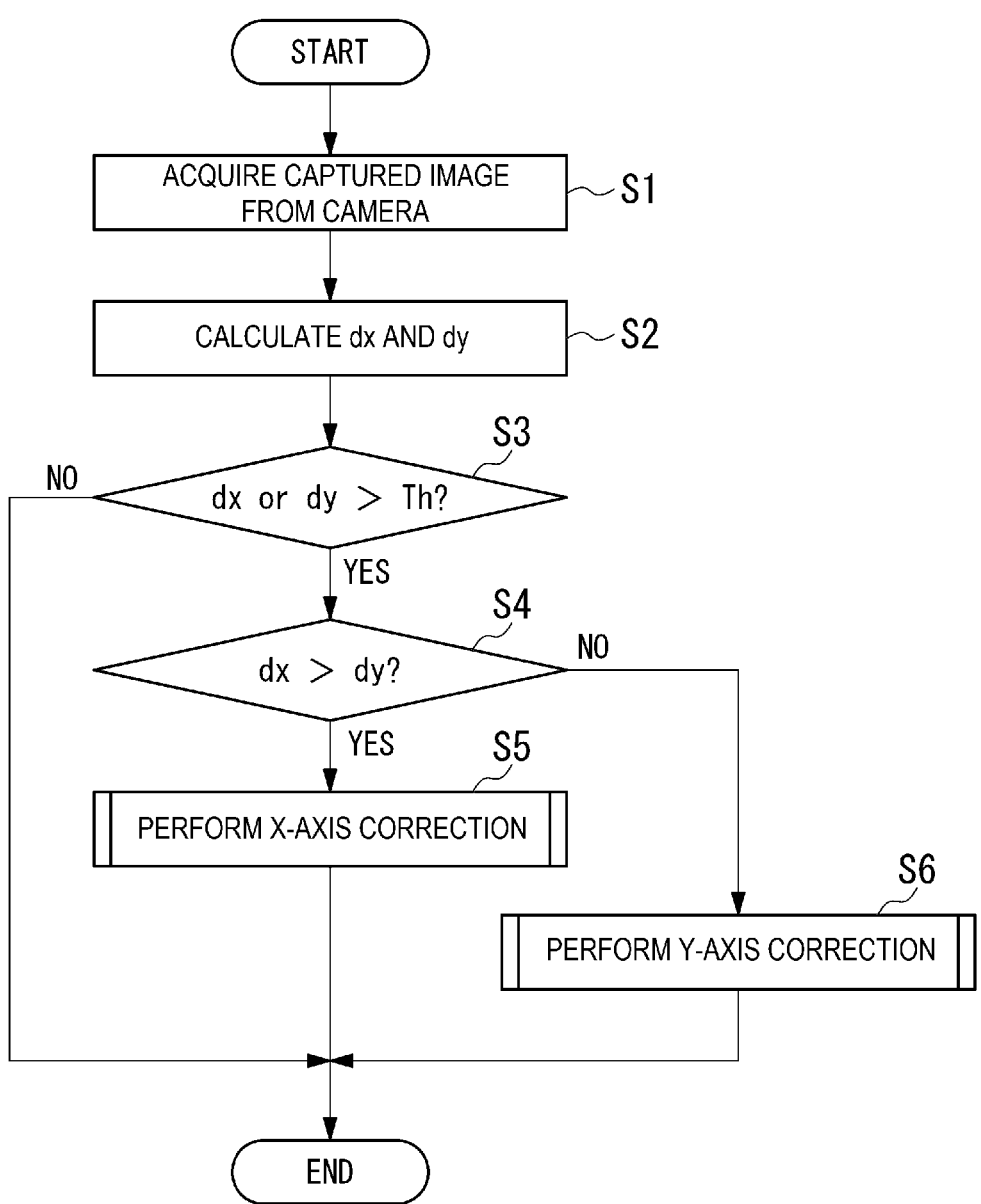
FIG. 3 is a flowchart showing pixel shift correction.

Embodiments of the present disclosure will be described below with reference to the drawings. In the figures below, the scale of each member differs in some cases from the actual value to make the member large enough to be recognizable.

First Embodiment

Figure 1:
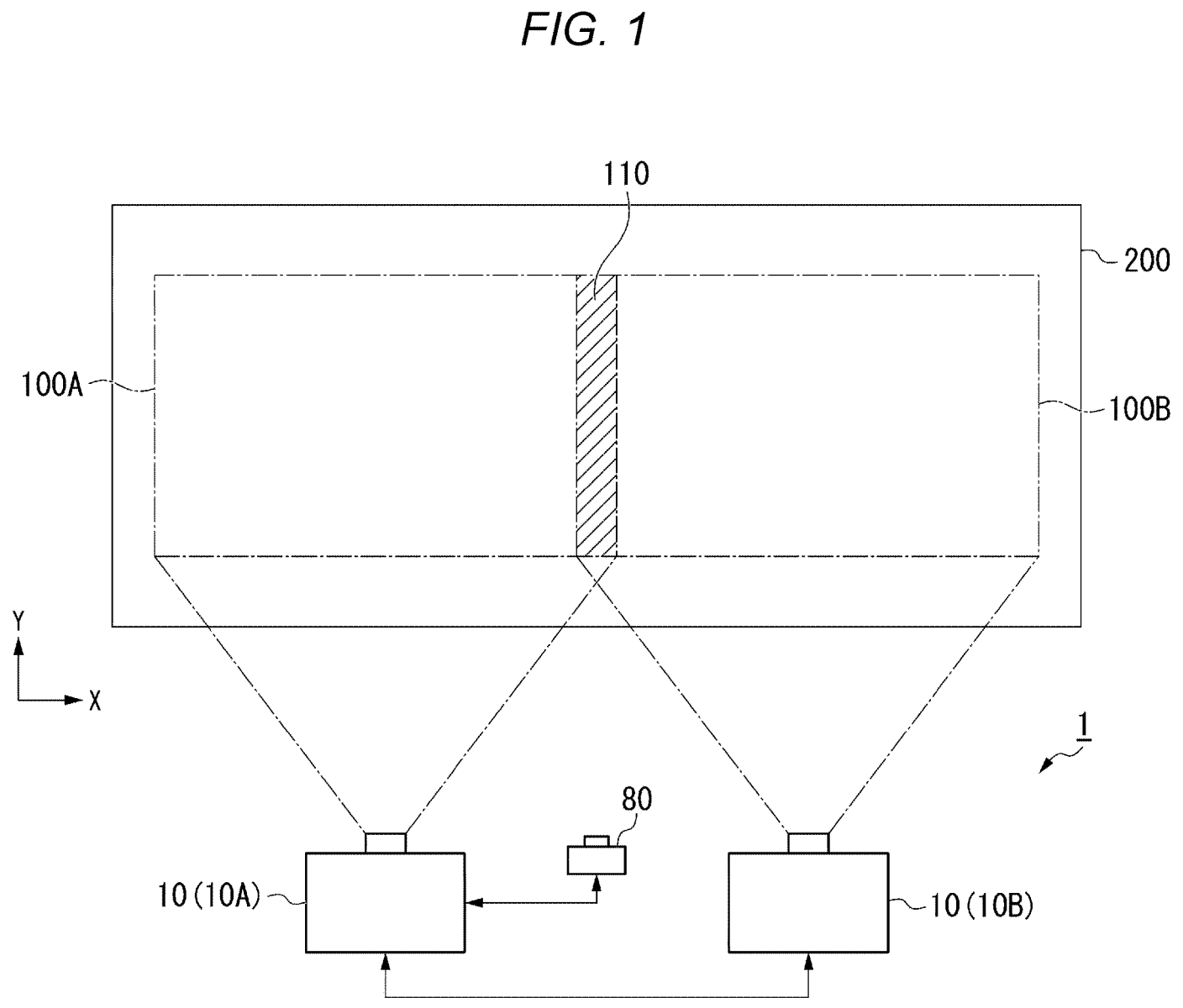

A first embodiment of the present disclosure will be described below. FIG. 1 shows a schematic configuration of a projection system 1 according to the first embodiment. The projection system 1 is a multi-projection system that displays a single image on a projection surface 200 by tiling a plurality of images projected from a plurality of projectors 10 onto a projection surface 200. The projection surface 200 may be a dedicated projection screen, or a surface of an object such as a wall surface.

As an example, the projection system 1 includes two projectors 10 and a camera 80. In the following description, one of the projectors 10 may be referred to as a "first projector 10A", and the other projector 10 may be referred to as a "second projector 10B". The first projector 10A projects a first image 100A on the projection surface 200. The second projector 10B projects a second image 100B on the projection surface 200.

The first projector 10A projects the first image 100A at a first position on the projection surface 200. The second projector 10B projects the second image 100B, at least part of which overlaps with the first image 100A, at a second position on the projection surface 200. For example, the center position of the first image 100A coincides with the first position, and the center position of the second image 100B coincides with the second position. In the following description, a region 110, where the first image 100A and the second image 100B overlap with each other, is referred in some cases to as an "overlapping region 110".

The first projector 10A communicates with the second projector 10B. The communication between the first projector 10A and the second projector 10B may be wired or wireless communication. For example, short-range wireless communication such as Bluetooth (registered trademark) may be employed as the wireless communication.

The camera 80 captures an image of the projection surface 200. The camera 80 does not need to capture an image of the entire projection surface 200, and only needs to capture an image of a region containing at least the overlapping region 110. In other words, at least the overlapping region 110 only needs to fall within the angle of view of the camera 80. For example, the camera 80 is coupled to the first projector 10A via a communication cable such as a universal serial bus (USB) cable.

The camera 80 captures an image of the projection surface 200 in response to an image capture request signal transmitted from the first projector 10A to the camera 80, and outputs captured image data representing the captured image of the projection surface 200 to the first projector 10A. The camera 80 may be disposed at a position separate from the first projector 10A or may be attached to the enclosure of the first projector 10A. The camera 80 may instead be disposed in the enclosure of the first projector 10A. That is, the first projectors 10A may include the camera 80.

FIG. 1 additionally shows an X-axis and a Y-axis perpendicular to the X-axis as the coordinate axes of a global coordinate system. The X-axis is an axis parallel to the horizontal sides of a rectangular projection region containing the first image 100A and the second image 100B, and the Y-axis is an axis parallel to the vertical sides of the projection region. The direction that the arrow on each of the axes points toward is the direction toward the positive end thereof, and the opposite direction of the direction toward the positive end thereof is the direction toward the negative end thereof. It is assumed in the following description that an image coordinate system of the camera 80, that is, the coordinate system of the captured image produced by the camera 80, and a unique local coordinate system of each of the projectors 10 coincide with the global coordinate system.

Figure 2:
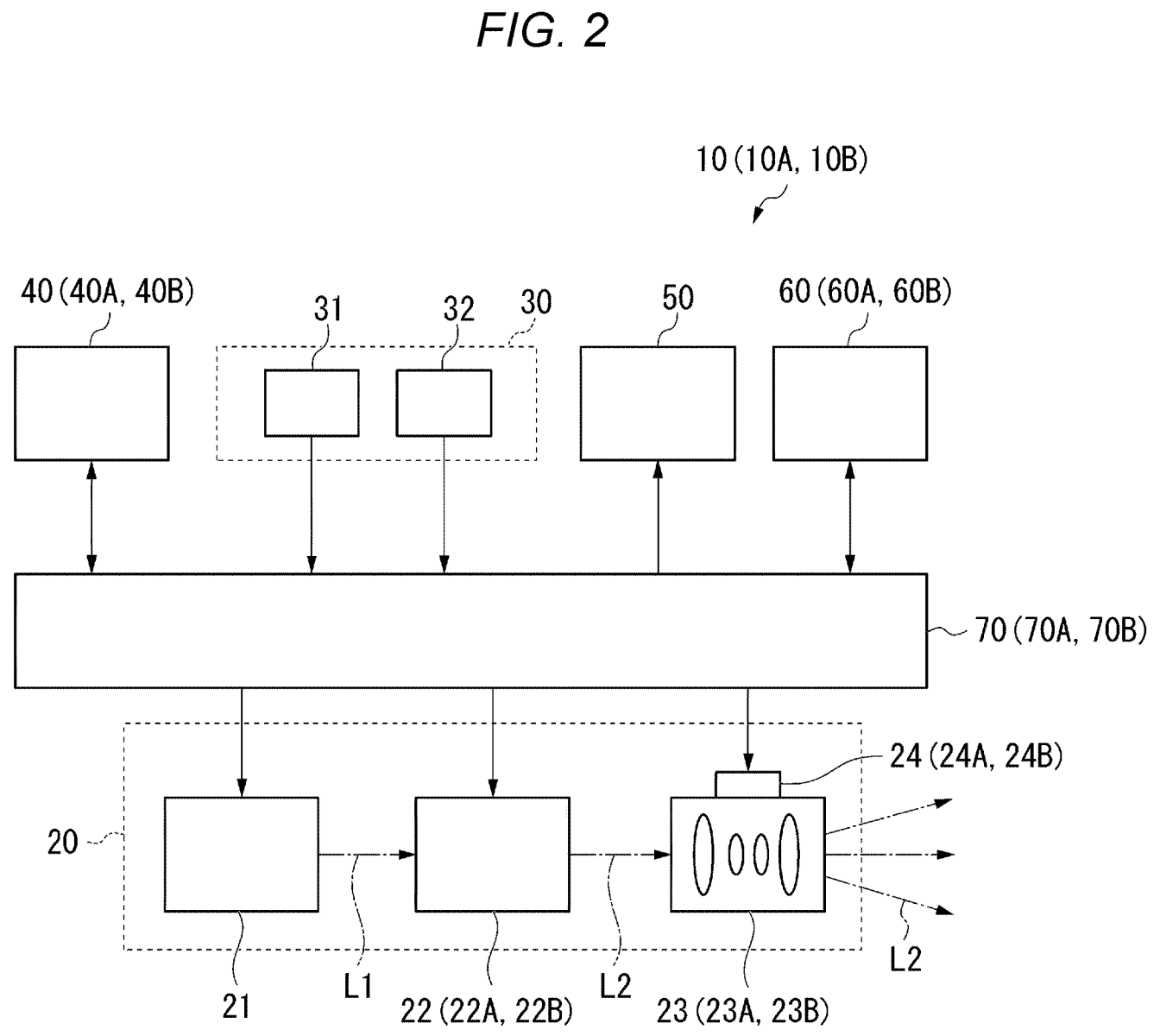

FIG. 2 is a block diagram showing a schematic configuration of each of the projectors 10. The projector 10 includes an optical apparatus 20, an input apparatus 30, a communication apparatus 40, a loudspeaker 50, a memory 60, and a processing apparatus 70.

The optical apparatus 20 includes a light source 21, a liquid crystal panel 22, a projection lens 23, and an actuator 24. The light source 21 outputs white light L1 to the liquid crystal panel 22. For example, the light source 21 is a mercury lamp, a xenon lamp, an LED (light emitting diode), or a laser light source. The amount of white light L1 output from the light source 21 is controlled by the processing apparatus 70.

The liquid crystal panel 22 is, for example, an actively driven liquid crystal panel including thin film transistors (TFTs) as pixel switching devices on a pixel basis. The light transmittance of each pixel of the liquid crystal panel 22 is controlled by the processing apparatus 70. As a result, the liquid crystal panel 22 functions as a light modulator. The liquid crystal panel 22 modulates the white light L1 incident from the light source 21 to output image light L2, which is the mixture of red light, green light, and blue light, to the projection lens 23. Note that the optical apparatus 20 may have a configuration including one or more liquid crystal panels or one or more digital mirror devices (DMDs).

The image coordinate system of the liquid crystal panel 22, that is, a panel image coordinate system coincides with the local coordinate system of the projector 10. In the present embodiment, in which the local coordinate system of the projector 10 is assumed to coincide with the global coordinate system as described above, the panel image coordinate system also coincides with the global coordinate system.

In the following description, the liquid crystal panel 22 provided in the first projector 10A may be referred to as a "first liquid crystal panel 22A", and the liquid crystal panel 22 provided in the second projector 10B may be referred to as a "second liquid crystal panel 22B".

The first image 100A projected onto the projection surface 200 corresponds to a first panel image displayed in the display region of the first liquid crystal panel 22A provided in the first projector 10A. The second image 100B projected onto the projection surface 200 corresponds to a second panel image displayed in the display region of the second liquid crystal panel 22B provided in the second projector 10B.

The projection lens 23 includes a plurality of lenses, enlarges the image light L2 incident from the liquid crystal panel 22, and projects the enlarged image light L2 onto the projection surface 200. When the projector 10 in question is the first projector 10A, the image light L2 projected from the projection lens 23 onto the projection surface 200 corresponds to the first image 100A. When the projector 10 in question is the second projector 10B, the image light L2 projected from the projection lens 23 onto the projection surface 200 corresponds to the second image 100B.

In the following description, the projection lens 23 provided in the first projector 10A may be referred to as a "first projection lens 23A", and the projection lens 23 provided in the second projector 10B may be referred to as a "second projection lens 23B".

The actuator 24 adjusts the position of the projection lens 23 in the local coordinate system of the corresponding projector 10. In the present embodiment, in which the local coordinate system of the projector 10 is assumed to coincide with the global coordinate system as described above, the projection lens 23 is movable along each of two axes including the X-axis and the Y-axis. For example, the actuator 24 includes a motor, an apparatus that converts the rotational motion of the motor into biaxial linear motion of the projection lens 23, and other components. The action of the actuator 24 is controlled by the processing apparatus 70.

In the following description, the actuator 24 provided in the first projector 10A may be referred to as a "first actuator 24A", and the actuator 24 provided in the second projector 10B may be referred to as a "second actuator 24B".

The first actuator 24A adjusts the position of the first projection lens 23A to adjust the position where the first image 100A is projected, focusing, zooming, and other types of operation. That is, the position of the first image 100A projected onto the projection surface 200 changes in accordance with the position of the first projection lens 23A provided in the first projector 10A.

The second actuator 24B adjusts the position of the second projection lens 23B to adjust the position where the second image 100B is projected, focusing, zooming, and other types of operation. That is, the position of the second image 100B projected onto the projection surface 200 changes in accordance with the position of the second projection lens 23B provided in the second projector 10B.

The input apparatus 30 is an apparatus that accepts a user's input operation performed on the corresponding projector 10. As an example, the input apparatus 30 includes an operation panel 31 and a light receiver 32. The operation panel 31 is formed of a plurality of operation keys provided as part of the projector 10. For example, the operation keys include a power key, a menu activation key, a direction key, a finalizing key, and a volume adjustment key. The operation keys may be hardware keys, or software keys displayed on a touch panel provided as part of the projector 10. The operation panel 31 outputs an electric signal generated by the user operating any of the operation keys to the processing apparatus 70 as an operation signal.

The light receiver 32 includes a photoelectric conversion circuit that receives infrared light transmitted from a remote control (not shown) associated with the projector 10 and converts the infrared light into an electric signal. The light receiver 32 outputs the electric signal generated by the photoelectric conversion of the infrared light to the processing apparatus 70 as a remote operation signal. The remote control is provided with a plurality of operation keys, as the operation panel 31 is. The remote control converts an electric signal produced when the user operates any of the operation keys provided as part of the remote control into infrared light and transmits the infrared light to the projector 10. That is, the remote operation signal output from the light receiver 32 is substantially the same as the electric signal generated when the user operates any of the operation keys of the remote control. When the remote control transmits a radio signal in accordance with a short-range wireless communication standard, such as Bluetooth (registered trademark), a receiver that receives the radio signal may be provided in place of the light receiver 32.

The communication apparatus 40 relays communication between the processing apparatus 70 and an external apparatus. When the projector 10 in question is the first projector 10A, the communication apparatus 40 relays communication between the external apparatus, such as the second projector 10B and the camera 80, and the processing apparatus 70. When the projector 10 in question is the second projector 10B, the communication apparatus 40 relays communication between the external apparatus, such as the first projector 10A, and the processing apparatus 70.

In the following description, the communication apparatus 40 provided in the first projector 10A may be referred to as a "first communication apparatus 40A", and the communication apparatus 40 provided in the second projector 10B may be referred to as a "second communication apparatus 40B".

The loudspeaker 50 outputs audio having predetermined volume under the control of the processing apparatus 70.

The memory 60 includes a nonvolatile memory that stores a program and a variety of setting data necessary for the processing apparatus 70 to carry out a variety of processes, and a volatile memory used as a temporary data saving destination when the processing apparatus 70 carries out the variety of processes. The nonvolatile memory is, for example, an EEPROM (electrically erasable programmable read-only memory), a ROM (read only memory), or a flash memory. The volatile memory is, for example, a RAM (random access memory).

In the following description, the memory 60 provided in the first projector 10A may be referred to as a "first memory 60A", and the memory 60 provided in the second projector 10B may be referred to as a "second memory 60B".

The processing apparatus 70 is a processor that carries out the variety of processes in accordance with the program stored in advance in the memory 60. The processing apparatus 70 is formed of one or more CPUs (central processing units) by way of example. Part or entirety of the functions of the processing apparatus 70 may be achieved, for example, by a DSP (digital signal processor), an ASIC (application specific integrated circuit), a PLD (programmable logic device), or an FPGA (field programmable gate array). The processing apparatus 70 concurrently or successively carries out the variety of processes.

In the following description, the processing apparatus 70 provided in the first projector 10A may be referred to as a "first processing apparatus 70A", and the processing apparatus 70 provided in the second projector 10B may be referred to as a "second processing apparatus 70B".

Although will be described later in detail, the first processing apparatus 70A of the first projector 10A performs pixel shift correction in accordance with the program stored in advance in the first memory 60A. The pixel shift correction is the process of correcting a pixel shift between the first image 100A and the second image 100B in the overlapping region 110.

FIG. 3 is a flowchart showing the pixel shift correction performed by the first processing apparatus 70A of the first projector 10A. The first processing apparatus 70A reads the program from the first memory 60A and executes the program to perform the pixel shift correction shown in FIG. 3. The first processing apparatus 70A repeatedly performs the pixel shift correction at predetermined time intervals.

The first processing apparatus 70A acquires a captured image of the projection surface 200 from the camera 80 (step S1). Specifically, the first processing apparatus 70A transmits the image capture request signal to the camera 80 via the first communication apparatus 40A. The camera 80 captures an image of the projection surface 200 in response to the image capture request signal, and outputs captured image data representing the captured image of the projection surface 200 to the first projector 10A. That is, in step S1, the first processing apparatus 70A receives the captured image data, which represents the captured image of the projection surface 200, from the camera 80. The captured image includes at least an image corresponding to the overlapping region 110.

The first processing apparatus 70A subsequently calculates the amount and direction of the relative pixel shift between the first image 100A and the second image 100B in the overlapping region 110 based on the captured image (step S2). In the following description, the amount of pixel shift along the X-axis between the first image 100A and the second image 100B is referred to as "the amount of X-axis shift dx", and the amount of pixel shift along the Y-axis between the first image 100A and the second image 100B is referred to as "the amount of Y-axis shift dy". That is, in step S2, the first processing apparatus 70A calculates the amount of X-axis shift dx and the amount of Y-axis shift dy in the overlapping region 110 based on the captured image. The first processing apparatus 70A temporarily saves the amount of X-axis shift dx and the amount of Y-axis shift dy in the first memory 60A.

A method for calculating the amount and direction of the relative pixel shift is not limited to a specific method. For example, the method disclosed in JP-A-2021-061510 is applicable as the method for calculating the amount and direction of the relative pixel shift. Therefore, see JP-A-2021-061510 for the specific calculation method. Any other known technology may be applied as the method for calculating the amount and direction of the relative pixel shift. For example, based on the captured image, feature points contained in each of the first image 100A and the second image 100B may be extracted, and the amount of X-axis shift dx and the amount of Y-axis shift dy may be calculated based on the distance between the feature points and the direction in which the feature points are arranged.

The first processing apparatus 70A subsequently evaluates whether the amount of X-axis shift dx or the amount of Y-axis shift dy is greater than a threshold Th (step S3). For example, the threshold Th is equal to the lower limit of the amount of pixel shift that can be calculated from the captured image. When the amount of X-axis shift dx or the amount of Y-axis shift dy is greater than the threshold Th (Yes in step S3), the first processing apparatus 70A transitions to step S4. On the other hand, when the amount of X-axis shift dx and the amount of Y-axis shift dy are both smaller than the threshold Th (No in step S3), the first processing apparatus 70A deletes the amount of X-axis shift dx and the amount of Y-axis shift dy temporarily saved in the first memory 60A and then terminates the pixel shift correction.

Upon the transition to step S4, the first processing apparatus 70A evaluates whether the amount of X-axis shift dx is greater than the amount of Y-axis shift dy (step S4). When the amount of X-axis shift dx is greater than the amount of Y-axis shift dy (Yes in step S4), the first processing apparatus 70A performs X-axis correction (step S5). On the other hand, when the amount of X-axis shift dx is smaller than the amount of Y-axis shift dy (No in step S4), the first processing apparatus 70A performs Y-axis correction (step S6). When the amount of X-shift dx is equal to the amount of Y-axis shift dy in the evaluation, the correction to be performed may not be specifically selected, that is, the X-axis correction or the Y-axis correction may be performed.

FIG. 4 is a flowchart showing the X-axis correction performed by the first processing apparatus 70A. Upon the start of the X-axis correction, the first processing apparatus 70A first increments the value of a first count variable nx (step S11). The first count variable nx is a variable representing the number of times the X-axis correction has been performed. Note that the value of the first count variable nx is reset to "0" in advance before the X-axis correction is performed for the first time.

The first processing apparatus 70A subsequently links the amount of X-axis shift dx temporarily saved in the first memory 60A with the value of the first count variable nx and saves the result in the first memory 60A (step S12). In the following description, for example, dx(nx) represents the amount of X-axis shift dx saved when the X-axis correction is performed for the nx-th time.

The first processing apparatus 70A subsequently evaluates whether the value of the first count variable nx is "1" (step S13). In other words, the first processing apparatus 70A evaluates in step S13 whether the current X-axis correction is the first X-axis correction. When the value of the first count variable nx is "1" (Yes in step S13), the first processing apparatus 70A transitions to step S14. On the other hand, when the value of the first count variable nx is not "1" (No in step S13), the first processing apparatus 70A transitions to step S15.

Upon the transition to step S14, the first processing apparatus 70A moves the first image 100A by a unit amount of displacement toward the positive end of X direction (step S14). For example, the unit amount of displacement is set at a value greater than or equal to the lower limit of the amount of pixel shift that can be calculated from the captured image. The reason for this is that when the unit amount of displacement is set at a value smaller than the lower limit of the amount of pixel shift that can be calculated from the captured image, the fact that the first image 100A has been moved cannot be recognized from the captured image.

As already described above, the position of the first image 100A projected onto the projection surface 200 changes in accordance with the position of the first projection lens 23A provided in the first projector 10A. The first processing apparatus 70A may therefore move the first image 100A in step S14 by the unit amount of displacement toward the positive end of the X direction by changing the position of the first projection lens 23A with the first actuator 24A.

The first image 100A projected onto the projection surface 200 corresponds to the first panel image displayed in the display region of the first liquid crystal panel 22A provided in the first projector 10A. The first processing apparatus 70A may therefore move the first image 100A by the unit amount of displacement toward the positive end of the X direction in step S14 by changing the position where the first panel image is displayed in the display region of the first liquid crystal panel 22A.

In the following description, when the process of moving the first image 100A takes place, the first image 100A is moved in the same manner as in step S14. After executing step S14, the first processing apparatus 70A terminates the X-axis correction and also terminates the pixel shift correction.

Upon the transition to step S15, the first processing apparatus 70A evaluates whether Conditional Expression (1) below is satisfied (step S15). In Conditional Expression (1) below, dx(nx) represents the amount of X-axis shift dx saved when the nx-th X-axis correction is performed, and dx(nx−1) represents the amount of X-axis shift dx saved when the (nx−1)-th X-axis correction is performed. In other words, dx(nx) represents the current value of the amount of X-axis shift dx, and dx(nx−1) represents the previous value of the amount of X-axis shift dx.

$$dx(nx) < dx(nx-1) \tag{1}$$

The first processing apparatus 70A transitions to step S19 when Conditional Expression (1) is satisfied (Yes in step S15), that is, when the current value of the amount of X-axis shift dx is smaller than the previous value of the amount of X-axis shift dx. On the other hand, the first processing apparatus 70A transitions to step S16 when Conditional Expression (1) is not satisfied (No in step S15), that is, when the current value of the amount of X-axis shift dx is greater than the previous value of the amount of X-axis shift dx.

Upon the transition to step S16, the first processing apparatus 70A evaluates whether the first image 100A was moved when the previous X-axis correction, that is, the (nx−1)-th X-axis correction was performed (step S16).

When the first processing apparatus 70A determines that the first image 100A was moved in the previous X-axis correction (Yes in step S16), the first processing apparatus 70A moves the first image 100A by the unit amount of displacement in the opposite direction of the previous shift direction (step S17). The previous shift direction is the direction in which the first image 100A or the second image 100B was moved when the previous X-axis correction was performed. After executing step S17, the first processing apparatus 70A terminates the X-axis correction and also terminates the pixel shift correction.

On the other hand, when the first processing apparatus 70A determines that the second image 100B was moved in the previous X-axis correction (No in step S16), the first processing apparatus 70A moves the second image 100B by the unit amount of displacement in the opposite direction of the previous shift direction (step S18). More specifically, in step S18, the first processing apparatus 70A instructs the second projector 10B via the first communication apparatus 40A to move the second image 100B by the unit amount of displacement in the opposite direction of the previous shift direction.

Upon reception of the instruction described above from the first projector 10A via the second communication apparatus 40B, the second processing apparatus 70B of the second projector 10B moves the second image 100B by the unit amount of displacement in the opposite direction from the previous shift direction.

As already described above, the position of the second image 100B projected onto the projection surface 200 changes in accordance with the position of the second projection lens 23B provided in the second projector 10B. The second processing apparatus 70B may therefore move the second image 100B by the unit amount of displacement in the opposite direction of the previous shift direction by changing the position of the second projection lens 23B with the second actuator 24B.

The second image 100B projected onto the projection surface 200 corresponds to the second panel image displayed in the display region of the second liquid crystal panel 22B provided in the second projector 10B. The second processing apparatus 70B may therefore move the second image 100B by the unit amount of displacement in the opposite direction of the previous shift direction by changing the position where the second panel image is displayed in the display region of the second liquid crystal panel 22B.

In the following description, when the process of moving the second image 100B takes place, the second image 100B is moved in the same manner as in step S18. After executing step S18, the first processing apparatus 70A terminates the X-axis correction and also terminates the pixel shift correction.

Upon the transition to step S19, the first processing apparatus 70A evaluates whether Conditional Expression (2) below is satisfied (step S19). In Conditional Expression (2) below, dx(nx−2) represents the amount of X-axis shift dx saved when the X-axis correction is performed for the (nx−2)-th time. In other words, dx(nx−2) represents the value preceding the previous value of the amount of X-axis shift dx. The case where Conditional Expression (2) below is satisfied is the case where step S17 or S18 was executed when the previous X-axis correction was performed.

$$nx \geq 3 \text{ and } dx(nx-1) > dx(nx-2) \qquad (2)$$

The first processing apparatus 70A transitions to step S20 when Conditional Expression (2) is satisfied (Yes in step S19), that is, when step S17 or S18 was executed in the previous X-axis correction. On the other hand, the first processing apparatus 70A transitions to step S23 when Conditional Expression (2) is not satisfied (No in step S19), that is, when step S17 or S18 was not executed in the previous X-axis correction.

Upon the transition to step S20, the first processing apparatus 70A evaluates whether the first image 100A was moved when the previous X-axis correction was performed (step S20). When the first processing apparatus 70A determines that the first image 100A was moved in the previous X-axis correction (Yes in step S20) the first processing apparatus 70A moves the first image 100A by the unit amount of displacement in the same direction as the previous shift direction (step S21). After executing step S21, the first processing apparatus 70A terminates the X-axis correction and also terminates the pixel shift correction.

On the other hand, when the first processing apparatus 70A determines that the second image 100B was moved in the previous X-axis correction (No in step S20), the first processing apparatus 70A moves the second image 100B by the unit amount of displacement in the same direction as the previous shift direction (step S22). After executing step S22, the first processing apparatus 70A terminates the X-axis correction and also terminates the pixel shift correction.

Upon the transition to step S23, the first processing apparatus 70A evaluates whether the first image 100A was moved when the previous X-axis correction was performed (step S23). When the first processing apparatus 70A determines that the first image 100A was moved in the previous X-axis correction (Yes in step S23) the first processing apparatus 70A moves the second image 100B by the unit amount of displacement in the opposite direction of the previous shift direction (step S24). After executing step S24, the first processing apparatus 70A terminates the X-axis correction and also terminates the pixel shift correction.

On the other hand, when the first processing apparatus 70A determines that the second image 100B was moved in the previous X-axis correction (No in step S23), the first processing apparatus 70A moves the first image 100A by the unit amount of displacement in the opposite direction of the previous shift direction (step S25). After executing step S25, the first processing apparatus 70A terminates the X-axis correction and also terminates the pixel shift correction.

FIG. 5 is a flowchart showing the Y-axis correction performed by the first processing apparatus 70A. Upon the start of the Y-axis correction, the first processing apparatus 70A first increments the value of a second count variable ny (step S31). The second count variable ny is a variable representing the number of times the Y-axis correction has been performed. Note that the value of the second count variable ny is reset to "O" in advance before the Y-axis correction is performed for the first time.

The first processing apparatus 70A subsequently links the amount of Y-axis shift dy temporarily saved in the first memory 60A with the value of the second count variable ny and saves the result in the first memory 60A (step S32). In the following description, for example, dy(ny) represents the amount of Y-axis shift dy saved when the Y-axis correction is performed for the ny-th time.

The first processing apparatus 70A subsequently evaluates whether the value of the second count variable ny is "1" (step S33). In other words, in step S33, the first processing apparatus 70A evaluates whether the current Y-axis correction is the first Y-axis correction. When the value of the second count variable ny is equal to "1" (Yes in step S33), the first processing apparatus 70A transitions to step S34. On the other hand, when the value of the second count variable ny is not "1" (No in step S33), the first processing apparatus 70A transitions to step S35.

Upon the transition to step S34, the first processing apparatus 70A moves the first image 100A by the unit amount of displacement toward the positive end of Y direction (step S34). After executing step S34, the first processing apparatus 70A terminates the Y-axis correction and also terminates the pixel shift correction.

Upon the transition to step S35, the first processing apparatus 70A evaluates whether Conditional Expression (3) below is satisfied (step S35). In Conditional Expression (3) below, dy(ny) represents the amount of Y-axis shift dy saved when the ny-th Y-axis correction is performed, and dy(ny−1) represents the amount of Y-axis shift dy saved when the (ny−1)-th Y-axis correction is performed. In other words, dy(ny) represents the current value of the amount of Y-axis shift dy, and dy(ny−1) represents the previous value of the amount of Y-axis shift dy.

$$dy(ny) < dy(ny-1) \qquad (3)$$

The first processing apparatus 70A transitions to step S39 when Conditional Expression (3) is satisfied (Yes in step S35), that is, when the current value of the amount of Y-axis shift dy is smaller than the previous value of the amount of Y-axis shift dy. On the other hand, the first processing apparatus 70A transitions to step S36 when Conditional Expression (3) is not satisfied (No in step S35), that is, when the current value of the amount of Y-axis shift dy is greater than the previous value of the amount of Y-axis shift dy.

Upon the transition to step S36, the first processing apparatus 70A evaluates whether the first image 100A was moved when the previous Y-axis correction, that is, the (ny−1)-th Y-axis correction was performed (step S36).

When the first processing apparatus 70A determines that the first image 100A was moved in the previous Y-axis correction (Yes in step S36), the first processing apparatus 70A moves the first image 100A by the unit amount of displacement in the opposite direction of the previous shift direction (step S37). The previous shift direction is the direction in which the first image 100A or the second image 100B was moved when the previous Y-axis correction was performed. After executing step S37, the first processing apparatus 70A terminates the Y-axis correction and also terminates the pixel shift correction.

On the other hand, when the first processing apparatus 70A determines that the second image 100B was moved in the previous Y-axis correction (No in step S36), the first processing apparatus 70A moves the second image 100B by the unit amount of displacement in the opposite direction of the previous shift direction (step S38). After executing step S38, the first processing apparatus 70A terminates the Y-axis correction and also terminates the pixel shift correction.

Upon the transition to step S39, the first processing apparatus 70A evaluates whether Conditional Expression (4) below is satisfied (step S39). In Conditional Expression (4) below, dy(ny−2) represents the amount of Y-axis shift dy saved when the (ny−2)-th Y-axis correction is performed. In other words, dy(ny−2) represents the value preceding the previous value of the amount of Y-axis shift dy. The case where Conditional Expression (4) below is satisfied is the case where step S37 or S38 was executed when the previous Y-axis correction was performed.

$$ny \geq 3 \text{ and } dy(ny-1) > dy(ny-2) \tag{4}$$

The first processing apparatus 70A transitions to step S40 when Conditional Expression (4) is satisfied (Yes in step S39), that is, when step S37 or S38 was executed in the previous Y-axis correction. On the other hand, the first processing apparatus 70A transitions to step S43 when Conditional Expression (4) is not satisfied (No in step S39), that is, when step S37 or S38 was not executed in the previous Y-axis correction.

Upon the transition to step S40, the first processing apparatus 70A evaluates whether the first image 100A was moved when the previous Y-axis correction was performed (step S40). When the first processing apparatus 70A determines that the first image 100A was moved in the previous Y-axis correction (Yes in step S40) the first processing apparatus 70A moves the first image 100A by the unit amount of displacement in the same direction as the previous shift direction (step S41). After executing step S41, the first processing apparatus 70A terminates the Y-axis correction and also terminates the pixel shift correction.

On the other hand, when the first processing apparatus 70A determines that the second image 100B was moved in the previous Y-axis correction (No in step S40), the first processing apparatus 70A moves the second image 100B by the unit amount of displacement in the same direction as the previous shift direction (step S42). After executing step S42, the first processing apparatus 70A terminates the Y-axis correction and also terminates the pixel shift correction.

Upon the transition to step S43, the first processing apparatus 70A evaluates whether the first image 100A was moved when the previous Y-axis correction was performed (step S43). When the first processing apparatus 70A determines that the first image 100A was moved in the previous Y-axis correction (Yes in step S43) the first processing apparatus 70A moves the second image 100B by the unit amount of displacement in the opposite direction of the previous shift direction (step S44). After executing step S44, the first processing apparatus 70A terminates the Y-axis correction and also terminates the pixel shift correction.

On the other hand, when the first processing apparatus 70A determines that the second image 100B was moved in the previous Y-axis correction (No in step S43), the first processing apparatus 70A moves the first image 100A by the unit amount of displacement in the opposite direction of the previous shift direction (step S45). After executing step S45, the first processing apparatus 70A terminates the Y-axis correction and also terminates the pixel shift correction.

The pixel shift correction has been described above. On the premise of the pixel shift correction described above, an example of the action of the projection system 1 will be specifically described below.

1. First Action Example

Figures 6, 7, 8:
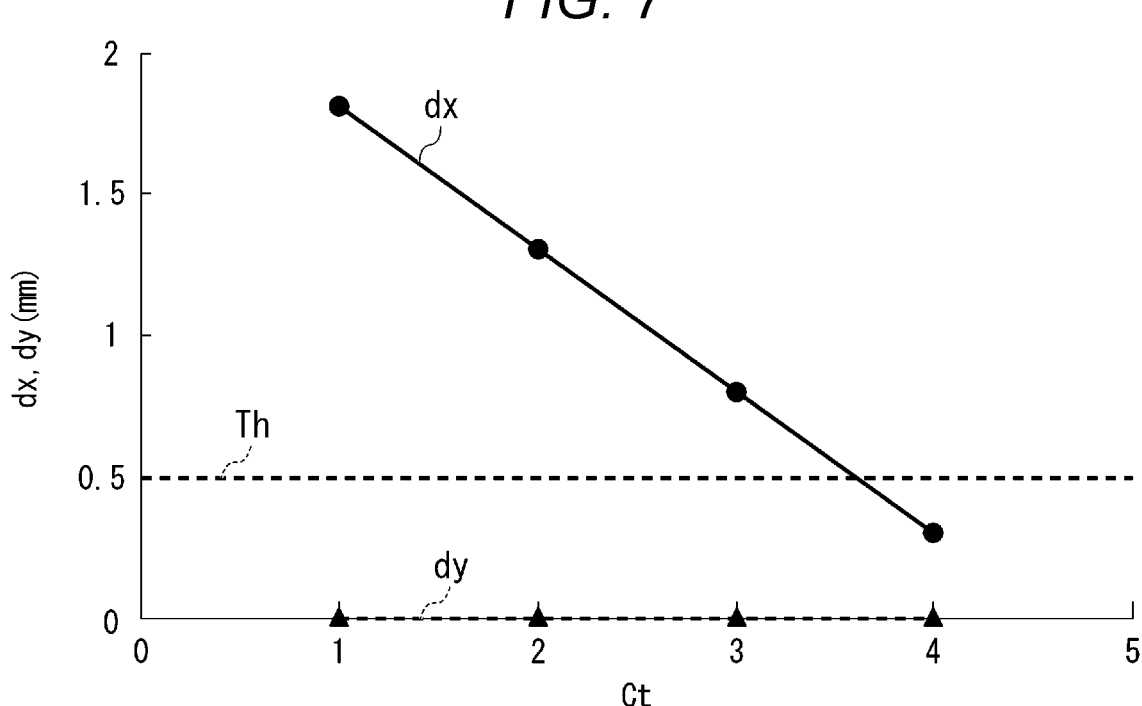
FIG. 6 is a table showing a first action example of the projection system.
FIG. 7 is a graph showing the first action example.
FIG. 8 is a table showing a second action example of the projection system.

A first action example of the projection system 1 will be described below with reference to FIGS. 6 and 7. FIG. 6 is a table showing the first action example of the projection system 1. In FIG. 6, Ct indicates the number of times the pixel shift correction has been performed. The symbols "A, +X" described in the remarks field of FIG. 6 mean moving the first image 100A by the unit amount of displacement toward the positive end of the X direction. The symbols "B, −X" described in the remarks field of FIG. 6 mean moving the second image 100B by the unit amount of displacement toward the negative end of the X direction. The symbol "−" described in the remarks field of FIG. 6 indicates that neither the X-axis correction nor the Y-axis correction is performed when the pixel shift correction is performed.

Note that the values and units of the amount of X-axis shift dx and the amount of Y-axis shift dy described in FIG. 6 are provisional values and units used to make the description easy, and the actual values and units of the amount of X-axis shift dx and the amount of Y-axis shift dy may differ from those in FIG. 6. FIG. 7 is a graph showing the first action example. The horizontal axis of FIG. 7 represents the value of Ct described in FIG. 6, and the vertical axis of FIG. 7 represents the values of the amount of X-axis shift dx and the amount of Y-axis shift dy described in FIG. 6. It is assumed in the first action example that the threshold Th and the unit amount of displacement are each set at 0.5 (mm).

1-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A. The captured image generated by executing step S1 of the first pixel shift correction is an example of a first captured image.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than a threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to a third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

Instead, in step S14, the first processing apparatus 70A may move the first image 100A from the first position to the third position by changing the position of the first projection lens 23A with the first actuator 24A. Still instead, in step S14, the first processing apparatus 70A may move the first image 100A from the first position to the third position by changing the position where the first panel image is displayed in the display region of the first liquid crystal panel 22A.

The process described above is the end of the first pixel shift correction.

1-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200. The captured image generated by executing step S1 of the second pixel shift correction is an example of a second captured image.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 1.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links the amount of X-axis shift dx temporarily saved in the first memory 60A with the value of the first count variable nx and saves the result in the first memory 60A (step S12). That is, 1.3 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 1.3 (mm), and the previous value dx(1) of the amount of X-axis shift dx is 1.8 (mm). In this case, since the current value dx(2) of the amount of X-axis shift dx is smaller than the previous value dx(1) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). Since the value of the first count variable nx is "2" at this point, Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The first image 100A was moved toward the positive end of the X direction when the previous X-axis correction was performed. The first processing apparatus 70A therefore determines that the first image 100A was moved when the previous X-axis correction was performed (Yes in step S23), and moves the second image 100B by 0.5 (mm) in the opposite direction of the previous shift direction, that is, in the X direction toward the negative end thereof (step S24).

The process of step S24 moves the second image 100B from the second position to a fourth position separate therefrom by 0.5 (mm) toward the negative end of the X direction. That is, the process of step S24 is in other words the process in which the first processing apparatus 70A moves the second image 100B from the second position to the fourth position separate therefrom by 0.5 (mm) toward the negative end of the X direction.

The process described above is the end of the second pixel shift correction.

When the current value dx(2) of the amount of X-axis shift dx is smaller than the previous value dx(1) of the amount of X-axis shift dx as a result of the second pixel shift correction, it is speculated that the X direction toward the positive end thereof in which the first image 100A was moved in the first pixel shift correction is the direction in which the amount of X-axis shift dx decreases. Therefore, in this case, when the second pixel shift correction is performed, the second image 100B can be moved by the unit amount of displacement in the opposite direction of the previous shift direction, that is, in the X direction toward the negative end thereof to further reduce the amount of X-axis shift dx.

1-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the fourth position on the projection surface 200.

The first processing apparatus 70A subsequently calculates the amount of X-axis shift dx and the amount of Y-axis shift dy in the overlapping region 110 based on the captured image (step S2). Step S2 of the third pixel shift correction provides 0.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 0.8 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 0.8 (mm), and the previous value dx(2) of the amount of X-axis shift dx is 1.3 (mm). In this case, since the current value dx(3) of the amount of X-axis shift dx is smaller than the previous value dx(2) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "3", the previous value dx(2) of the amount of X-axis shift dx is 1.3 (mm), and the value preceding the previous value dx(1) of the amount of X-axis shift dx is 1.8 (mm). In this case, the previous value dx(2) of the amount of X-axis shift dx is smaller than the value preceding the previous value dx(1) of the amount of X-axis shift dx, so that Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The second image 100B was moved toward the negative end of the X direction when the previous X-axis correction was performed. The first processing apparatus 70A therefore determines that the second image 100B was moved when the previous X-axis correction was performed (No in step S23), and moves the first image 100A by 0.5 (mm) in the opposite direction of the previous shift direction, that is, in the X direction toward the positive end thereof (step S25).

The process of step S25 moves the first image 100A to the position separate from the third position to the position separate therefrom by 0.5 (mm) toward the positive end of the X direction. That is, the process of step S25 is in other words the process in which the first processing apparatus 70A moves the first image 100A from the third position to the position separate therefrom by 0.5 (mm) toward the positive end of the X direction.

The process described above is the end of the third pixel shift correction.

When the current value dx(3) of the amount of X-axis shift dx is smaller than the previous value dx(2) of the amount of X-axis shift dx as a result of the third pixel shift correction, it is speculated that moving the second image 100B toward the negative end of the X direction in the second pixel shift correction further reduces the amount of X-axis shift dx. Therefore, in this case, when the third pixel shift correction is performed, the first image 100A can be moved by the unit amount of displacement in the opposite direction of the previous shift direction, that is, in the X direction toward the positive end thereof to further reduce the amount of X-axis shift dx.

1-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the position on the projection surface 200 separate from the third position by 0.5 (mm) toward the positive end of the X direction and the second image 100B projected by the second projector 10B at the fourth position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 0.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the fourth pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the fourth pixel shift correction.

The first action example has been described. As described above, in the first action example, performing the pixel shift correction and the X-axis correction three times makes the amount of X-axis shift dx and the amount of Y-axis shift dy both smaller than the threshold Th, so that the X-axis shift correction is not performed when the fourth pixel shift correction is performed.

As already described, when the current value dx(2) of the amount of X-axis shift dx is smaller than the previous value dx(1) of the amount of X-axis shift dx as a result of the second pixel shift correction, it is speculated that the X direction toward the positive end thereof in which the first image 100A was moved when the first pixel shift correction was performed is the direction in which the amount of X-axis shift dx decreases. Therefore, in this case, when the pixel shift correction is performed for the second time and later, the first image 100A and the second image 100B can be alternately moved in the direction in which the two images approach each other to reduce the amount of X-axis shift dx to a value smaller than the threshold Th. As described above, the present embodiment allows correction of the pixel shift between the first image 100A and the second image 100B only with the aid of the known amount and direction of the relative pixel shift between the first image 100A and the second image 100B, which are projected to overlap with each other.

The first projector 10A can adjust the position of the first image 100A over a limited range. Similarly, the second projector 10B can adjust the position of the second image 100B over a limited range. Therefore, if an attempt is made to reduce the amount of X-axis shift dx by moving only one of the first image 100A and the second image 100B, the one projector 10 reaches the limit of the position adjustable range earlier than in the case where the two images are moved, so that the upper limit of the range over which the amount of X-axis shift dx can be corrected lowers. In view of the fact described above, the first image 100A and the second image 100B are moved alternately in the direction in which the two images approach each other in the present embodiment. The configuration described above can delay the point of time when the two projectors 10 each reach the limit of the position adjustable range, so that the upper limit of the range over which the amount of X-axis shift dx can be corrected can be raised.

Furthermore, in the present embodiment, the X-axis correction is performed when the amount of X-axis shift dx is greater than the amount of Y-axis shift dy, and the Y-axis correction is performed when the amount of X-axis shift dx is smaller than the amount of Y-axis shift dy. Preferentially carrying out the process of reducing a larger amount of pixel shift out of the amount of X-axis shift dx and the amount of Y-axis shift dy as described above can correct the pixel shift between the first image 100A and the second image 100B at an early stage.

As understood from the description of the aforementioned first action example, the first processing apparatus 70A performs the first pixel shift correction and the second pixel shift correction to achieve a projection image adjustment method including steps 1 to 6 described below.

The first step is acquiring the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A.

The second step is acquiring based on the first captured image the amount of X-axis shift dx along the X-axis between the first image 100A and the second image 100B. The X-axis is an example of a first axis that is a coordinate axis of the global coordinate system. The amount of X-axis shift dx acquired based on the first captured image, that is, the amount of X-axis shift dx acquired when the first pixel shift correction is performed is an example of a first amount of shift.

The third step is causing the first projector 10A to move the first image 100A from the first position to the third position separate therefrom by the unit amount of displacement toward the positive end of the X direction. The X direction toward the positive end thereof is an example of a first direction corresponding to the direction toward one end of the first axis. The third position separate from the first position by the unit amount of displacement toward the positive end of the X direction is an example of the third position separate from the first position by a first distance in the first direction.

The first to third steps described above are achieved by the first processing apparatus 70A performing the first pixel shift correction.

The fourth step is acquiring the second captured image from the camera 80 by causing the camera 80 to capture an image of the projection surface 200 with the first image 100A projected by the first projector 10A at the third position and the second image 100B projected by the second projector 10B at the second position.

The fifth step is acquiring based on the second captured image the amount of X-axis shift dx along the X-axis between the first image 100A and the second image 100B. The amount of X-axis shift dx acquired based on the second captured image, that is, the amount of X-axis shift dx acquired when the second pixel shift correction is performed is an example of a second amount of shift.

The sixth step is causing the second projector 10B to move the second image 100B from the second position to the fourth position separate therefrom by the unit amount of displacement toward the negative end of the X direction when the amount of X-axis shift dx produced when the second pixel shift correction is performed is smaller than the amount of X-axis shift dx produced when the first pixel shift correction is performed, that is, when the second amount of shift is smaller than the first amount of shift. The direction X toward the negative end thereof is an example of a second direction that is the opposite direction of the first direction. The fourth position separate from the second position by the unit amount of displacement toward the negative end of the X direction is an example of the fourth position separate from the second position by a second distance in the second direction.

The fourth to sixth steps described above are achieved by the first processing apparatus 70A performing the second pixel shift correction.

The projection image adjustment method further includes, prior to causing the first projector 10A to move the first image 100A from the first position to the third position, acquiring based on the first captured image the amount of Y-axis shift dy along the Y-axis between the first image 100A and the second image 100B. The Y-axis is an example of a second axis perpendicular to the first axis. The amount of Y-axis shift dy is an example of a fifth amount of shift. When the amount of X-axis shift dx is greater than the amount of Y-axis shift dy, that is, when the first amount of shift is greater than the fifth amount of shift, the first image 100A is moved from the first position to the third position by the first projector 10A.

In the projection image adjustment method, the position of the first image 100A projected onto the projection surface 200 changes in accordance with the position of the first projection lens 23A provided in the first projector 10A, and causing the first projector 10A to move the first image 100A from the first position to the third position includes changing the position of the first projection lens 23A to move the first image 100A from the first position to the third position.

In the projection image adjustment method, the first image 100A corresponds to the first panel image displayed in the display region of the first liquid crystal panel 22A provided in the first projector 10A, and causing the first projector 10A to move the first image 100A from the first position to the third position includes changing the position where the first panel image is displayed in the display region of the first liquid crystal panel 22A to move the first image 100A from the first position to the third position. The first liquid crystal panel 22A is an example of a first panel.

2. Second Action Example

Figures 9, 10:
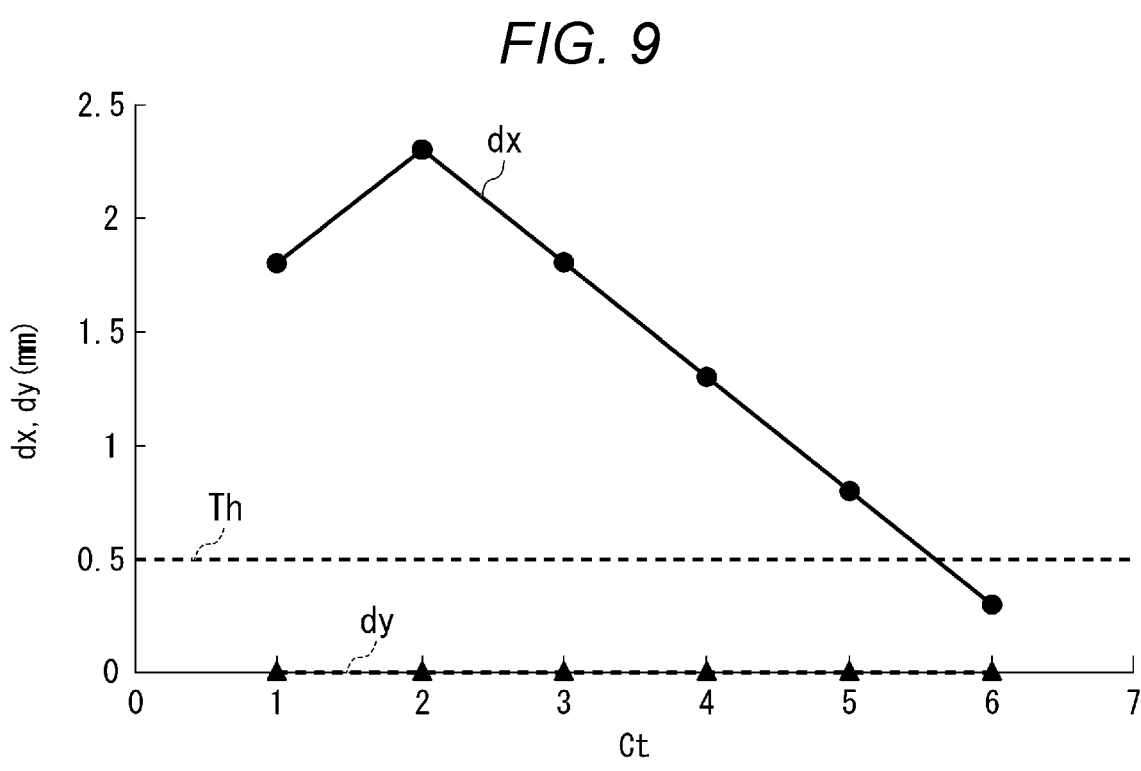
FIG. 9 is a graph showing the second action example.
FIG. 10 is a table showing a third action example of the projection system.

A second action example of the projection system 1 will be described below with reference to FIGS. 8 and 9. FIG. 8 is a table showing the second action example of the projection system 1. FIG. 9 is a graph showing the second action example. The horizontal axis of FIG. 9 shows the value of Ct described in FIG. 8, and the vertical axis of FIG. 9 shows the values of the amount of X-axis shift dx and the amount of Y-axis shift dy described in FIG. 8. It is assumed also in the second action example that the threshold Th and the unit amount of displacement are each set at 0.5 (mm), as in the first action example.

2-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A. The captured image generated by executing step S1 of the first pixel shift correction is an example of the first captured image.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to the third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

The process described above is the end of the first pixel shift correction.

2-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200. The captured image generated by executing step S1 of the second pixel shift correction is an example of the second captured image.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 2.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links the amount of X-axis shift dx temporarily saved in the first memory 60A with the value of the first count variable nx and saves the result in the first memory 60A (step S12). That is, 2.3 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 2.3 (mm), and the previous value dx(1) of the amount of X-axis shift dx is 1.8 (mm). In this case, the current value dx(2) of the amount of X-axis shift dx is greater than the previous value dx(1) of the amount of X-axis shift dx, so that Conditional Expression (1) is not satisfied. The first processing apparatus 70A therefore determines that Conditional Expression (1) is not satisfied (No in step S15), and transitions to step S16.

Upon the transition to step S16, the first processing apparatus 70A evaluates whether the first image 100A was moved when the previous X-axis correction was performed (step S16). The first image 100A was moved toward the positive end of the X direction when the previous X-axis correction was performed. The first processing apparatus 70A therefore determines that the first image 100A was moved when the previous X-axis correction was performed (Yes in step S16), and moves the first image 100A by 0.5 (mm) in the opposite direction of the previous shift direction, that is, in the X direction toward the negative end thereof (step S17).

The process of step S17 moves the first image 100A from the third position to a fifth position separate therefrom by 0.5 (mm) toward the negative end of the X direction. That is, the process of step S17 is in other words the process in which the first processing apparatus 70A moves the first image 100A from the third position to the fifth position separate therefrom by 0.5 (mm) toward the negative end of the X direction. The position separate from the first position by 0.5 (mm) toward the positive end of the X direction is the third position, and the position separate from the third position by 0.5 (mm) toward the negative end of the X direction is the fifth position. As a result, the fifth position coincides with the first position.

The process described above is the end of the second pixel shift correction.

When the current value dx(2) of the amount of X-axis shift dx is greater than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx increases. Therefore, in this case, when the second pixel shift correction is performed, the first image 100A that is the same image in the previous pixel shift correction can be moved by the unit amount of displacement in the opposite direction of the previous shift direction, that is, in the X direction toward the negative end thereof to correct the wrong shift direction at an early stage and hence reduce the amount of X-axis shift dx.

2-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the fifth position on the projection surface 200 and the second image 100B projected by the second projector 10B at the second position on the projection surface 200. The captured image generated by executing step S1 of the third pixel shift correction is an example of a third captured image.

The first processing apparatus 70A subsequently calculates the amount of X-axis shift dx and the amount of Y-axis shift dy in the overlapping region 110 based on the captured image (step S2). Step S2 of the third pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 1.8 (mm), and the previous value dx(2) of the amount of X-axis shift dx is 2.3 (mm). In this case, since the current value dx(3) of the amount of X-axis shift dx is smaller than the previous value dx(2) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "3", the previous value dx(2) of the amount of X-axis shift dx is 2.3 (mm), and the value preceding the previous value dx(1) of the amount of X-axis shift dx is 1.8 (mm). In this case, the previous value dx(2) of the amount of X-axis shift dx is greater than the value preceding the previous value dx(1) of the amount of X-axis shift dx, so that Conditional Expression (2) is satisfied. The first processing apparatus 70A therefore determines that Conditional Expression (2) is satisfied (Yes in step S19), and transitions to step S20.

Upon the transition to step S20, the first processing apparatus 70A evaluates whether the first image 100A was moved when the previous X-axis correction was performed (step S20). The first image 100A was moved toward the negative end of the X direction when the previous X-axis correction was performed. The first processing apparatus 70A therefore determines that the first image 100A was moved when the previous X-axis correction was performed (Yes in step S20), and moves the first image 100A by 0.5 (mm) in the same direction as the previous shift direction, that is, in the X direction toward the negative end thereof (step S21).

The process of step S21 moves the first image 100A from the fifth position to a sixth position separate therefrom by 0.5 (mm) toward the negative end of the X direction. That is, the process of step S21 is in other words the process in which the first processing apparatus 70A moves the first image 100A from the fifth position to the sixth position separate therefrom by 0.5 (mm) toward the negative end of the X direction.

The process described above is the end of the third pixel shift correction.

As described above, when the wrong shift direction is corrected by step S17 in the second pixel shift correction, the first image 100A is moved in the same direction as the previous shift direction in the third pixel shift correction. Therefore, even when the wrong shift direction cannot be sufficiently corrected in the second pixel shift correction, the wrong shift direction can be corrected when the third pixel shift correction is performed.

2-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the sixth position on the projection surface 200 and the second image 100B projected by the second projector 10B at the second position on the projection surface 200. The captured image generated by executing step S1 of the fourth pixel shift correction is an example of a fourth captured image.

The first processing apparatus 70A subsequently calculates the amount of X-axis shift dx and the amount of Y-axis shift dy in the overlapping region 110 based on the captured image (step S2). Step S2 of the fourth pixel shift correction provides 1.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "4" at this point.

The first processing apparatus 70A subsequently links the amount of X-axis shift dx temporarily saved in the first memory 60A with the value of the first count variable nx and saves the result in the first memory 60A (step S12). That is, 1.3 (mm), which is the value of the amount of X-axis shift dx, is linked with "4", which is the value of the first count variable nx, and saved in the first memory 60A.

The first processing apparatus 70A subsequently evaluates whether the value of the first count variable nx is "1" (step S13). Since the value of the first count variable nx is "4" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(4) of the amount of X-axis shift dx is 1.3 (mm), and the previous value dx(3) of the amount of X-axis shift dx is 1.8 (mm). In this case, since the current value dx(4) of the amount of X-axis shift dx is smaller than the previous value dx(3) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "4", the previous value dx(3) of the amount of X-axis shift dx is 1.8 (mm), and the value preceding the previous value dx(2) of the amount of X-axis shift dx is 2.3 (mm). In this case, the previous value dx(3) of the amount of X-axis shift dx is smaller than the value preceding the previous value dx(2) of the amount of X-axis shift dx, so that Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The first image 100A was moved toward the negative end of the X direction when the previous X-axis correction was performed. The first processing apparatus 70A therefore determines that the first image 100A was moved when the previous X-axis correction was performed (Yes in step S23), and moves the second image 100B by 0.5 (mm) in the opposite direction of the previous shift direction, that is, in the X direction toward the positive end thereof (step S24).

The process of step S24 moves the second image 100B from the second position to a seventh position separate therefrom by 0.5 (mm) toward the positive end of the X direction. That is, the process of step S24 is in other words the process in which the first processing apparatus 70A moves the second image 100B from the second position to the seventh position separate therefrom by 0.5 (mm) toward the positive end of the X direction.

The process described above is the end of the fourth pixel shift correction.

When the current value dx(4) of the amount of X-axis shift dx is smaller than the previous value dx(3) of the amount of X-axis shift dx as a result of the fourth pixel shift correction, it is speculated that moving the first image 100A toward the negative end of the X direction in the third pixel shift correction reduces the amount of X-axis shift dx. Therefore, in this case, when the fourth pixel shift correction is performed, the second image 100B can be moved by the unit amount of displacement in the opposite direction of the previous shift direction, that is, in the X direction toward the positive end thereof to further reduce the amount of X-axis shift dx.

2-5. Fifth Pixel Shift Correction (Ct=5)

Upon the start of the fifth pixel shift correction, the first processing apparatus 70A first acquires a captured image of the projection surface 200 from the camera 80 (step S1). More specifically, in step S1 of the fifth pixel shift correction, the first processing apparatus 70A acquires a captured image from the camera 80 by causing the camera 80 to capture an image of the projection surface 200 with the first image 100A projected by the first projector 10A at the sixth position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the fifth pixel shift correction provides 0.8 (mm) as the amount of X-axis shift dx and 0

(mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "5" at this point.

The first processing apparatus 70A subsequently links the amount of X-axis shift dx temporarily saved in the first memory 60A with the value of the first count variable nx and saves the result in the first memory 60A (step S12). That is, 0.8 (mm), which is the value of the amount of X-axis shift dx, is linked with "5", which is the value of the first count variable nx, and saved in the first memory 60A.

The first processing apparatus 70A subsequently evaluates whether the value of the first count variable nx is "1" (step S13). Since the value of the first count variable nx is "5" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(5) of the amount of X-axis shift dx is 0.8 (mm), and the previous value dx(4) of the amount of X-axis shift dx is 1.3 (mm). In this case, since the current value dx(5) of the amount of X-axis shift dx is smaller than the previous value dx(4) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "5", the previous value dx(4) of the amount of X-axis shift dx is 1.3 (mm), and the value preceding the previous value dx(3) of the amount of X-axis shift dx is 1.8 (mm). In this case, since the previous value dx(4) of the amount of X-axis shift dx is smaller than the value preceding the previous value dx(3) of the amount of X-axis shift dx, Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The second image 100B was moved toward the positive end of the X direction when the previous X-axis correction was performed. The first processing apparatus 70A therefore determines that the second image 100B was moved when the previous X-axis correction was performed (No in step S23), and moves the first image 100A by 0.5 (mm) in the opposite direction of the previous shift direction, that is, in the X direction toward the negative end thereof (step S25).

The process of step S25 moves the first image 100A from the sixth position to the position separate therefrom by 0.5 (mm) toward the negative end of the X direction. That is, the process of step S24 is in other words the process in which the first processing apparatus 70A moves the first image 100A from the sixth position to the position separate therefrom by 0.5 (mm) toward the negative end of the X direction.

The process described above is the end of the fifth pixel shift correction.

When the current value dx(5) of the amount of X-axis shift dx is smaller than the previous value dx(4) of the amount of X-axis shift dx as a result of the fifth pixel shift correction, it is speculated that moving the second image 100B toward the positive end of the X direction in the fourth pixel shift correction further reduces the amount of X-axis shift dx. Therefore, in this case, when the fifth pixel shift correction is performed, the first image 100A can be moved by the unit amount of displacement in the opposite direction of the previous shift direction, that is, in the X direction toward the negative end thereof to further reduce the amount of X-axis shift dx.

2-6. Sixth Pixel Shift Correction (Ct=6)

Upon the start of the sixth pixel shift correction, the first processing apparatus 70A first acquires a captured image of the projection surface 200 from the camera 80 (step S1). More specifically, in step S1 of the sixth pixel shift correction, the first processing apparatus 70A acquires a captured image from the camera 80 by causing the camera 80 to capture an image of the projection surface 200 with the first image 100A projected by the first projector 10A at the position on the projection surface 200 separate from the sixth position by 0.5 (mm) toward the negative end of the X direction and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the sixth pixel shift correction provides 0.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the sixth pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the sixth pixel shift correction.

The second action example has been described. As described above, in the second action example, performing the pixel shift correction and the X-axis correction five times makes the amount of X-axis shift dx and the amount of Y-axis shift dy both smaller than the threshold Th, so that the X-axis shift correction is not performed when the sixth pixel shift correction is performed.

As already described, when the current value dx(2) of the amount of X-axis shift dx is greater than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx increases. Therefore, in this case, when the second pixel shift correction is performed, the first image 100A that is the same image in the previous pixel shift correction can be moved in the opposite direction of the previous shift direction to correct the wrong shift direction at an early stage and hence reduce the amount of X-axis shift dx.

As described above, when the wrong shift direction is corrected by step S17 in the second pixel shift correction, the first image 100A is moved in the same direction as the previous shift direction in the third pixel shift correction. Therefore, even when the wrong shift direction cannot be sufficiently corrected in the second pixel shift correction, the wrong shift direction can be corrected when the third pixel shift correction is performed.

When the current value dx(4) of the amount of X-axis shift dx is smaller than the previous value dx(3) of the amount of X-axis shift dx as a result of the fourth pixel shift correction, it is speculated that moving the first image 100A toward the negative end of the X direction in the third pixel shift correction reduces the amount of X-axis shift dx. Therefore, in this case, when the pixel shift correction is performed for the fourth time and later, the first image 100A and the second image 100B can be alternately moved in the direction in which the two images separate from each other to reduce the amount of X-axis shift dx to a value smaller than the threshold Th.

As will be understood from the description of the second action example described above, the projection image adjustment method further includes causing the first projector 10A to move the first image 100A from the third position to the fifth position separate therefrom by the unit amount of displacement toward the negative end of the X direction when the amount of X-axis shift dx acquired when the second pixel shift correction is performed is greater than the amount of X-axis shift dx acquired when the first pixel shift correction is performed, that is, when the second amount of shift is greater than the first amount of shift. The fifth position separate from the third position by the unit amount of displacement toward the negative end of the X direction is an example of the fifth position separate from the third position by a third distance in the second direction.

The step described above is achieved by the first processing apparatus 70A performing the second pixel shift correction.

The projection image adjustment method further includes acquiring the third captured image from the camera 80 by causing the camera 80 to capture an image of the projection surface with the first image projected by the first projector 10A at the fifth position and the second image projected by the second projector 10B at the second position, acquiring, based on the third captured image, the amount of X-axis shift dx along the X-axis between the first image 100A and the second image 100B as a third amount of shift, and causing the first projector 10A to move the first image 100A from the fifth position to the sixth position separate therefrom by the unit amount of displacement toward the negative end of the X direction when the third amount of shift is smaller than the second amount of shift. The sixth position separate from the fifth position by the unit amount of displacement toward the negative end of the X direction is an example of the sixth position separate from the fifth position by a fourth distance in the second direction.

These steps are achieved by the first processing apparatus 70A performing the third pixel shift correction.

The projection image adjustment method further includes acquiring the fourth captured image from the camera 80 by causing the camera 80 to capture an image of the projection surface 200 with the first image 100A projected by the first projector 10A at the sixth position and the second image 100B projected by the second projector 10B at the second position, acquiring, based on the fourth captured image, the amount of X-axis shift dx along the X-axis between the first image 100A and the second image 100B as a fourth amount of shift, and causing the second projector 10B to move the second image 100B from the second position to the seventh position separate therefrom by the unit amount of displacement toward the positive end of the X direction when the fourth amount of shift is smaller than the third amount of shift. The seventh position separate from the second position by the unit amount of displacement toward the positive end of the X direction is an example of the seventh position separate from the second position by a fifth distance in the first direction.

These steps are achieved by the first processing apparatus 70A performing the fourth pixel shift correction.

3. Third Action Example

Figure 11:
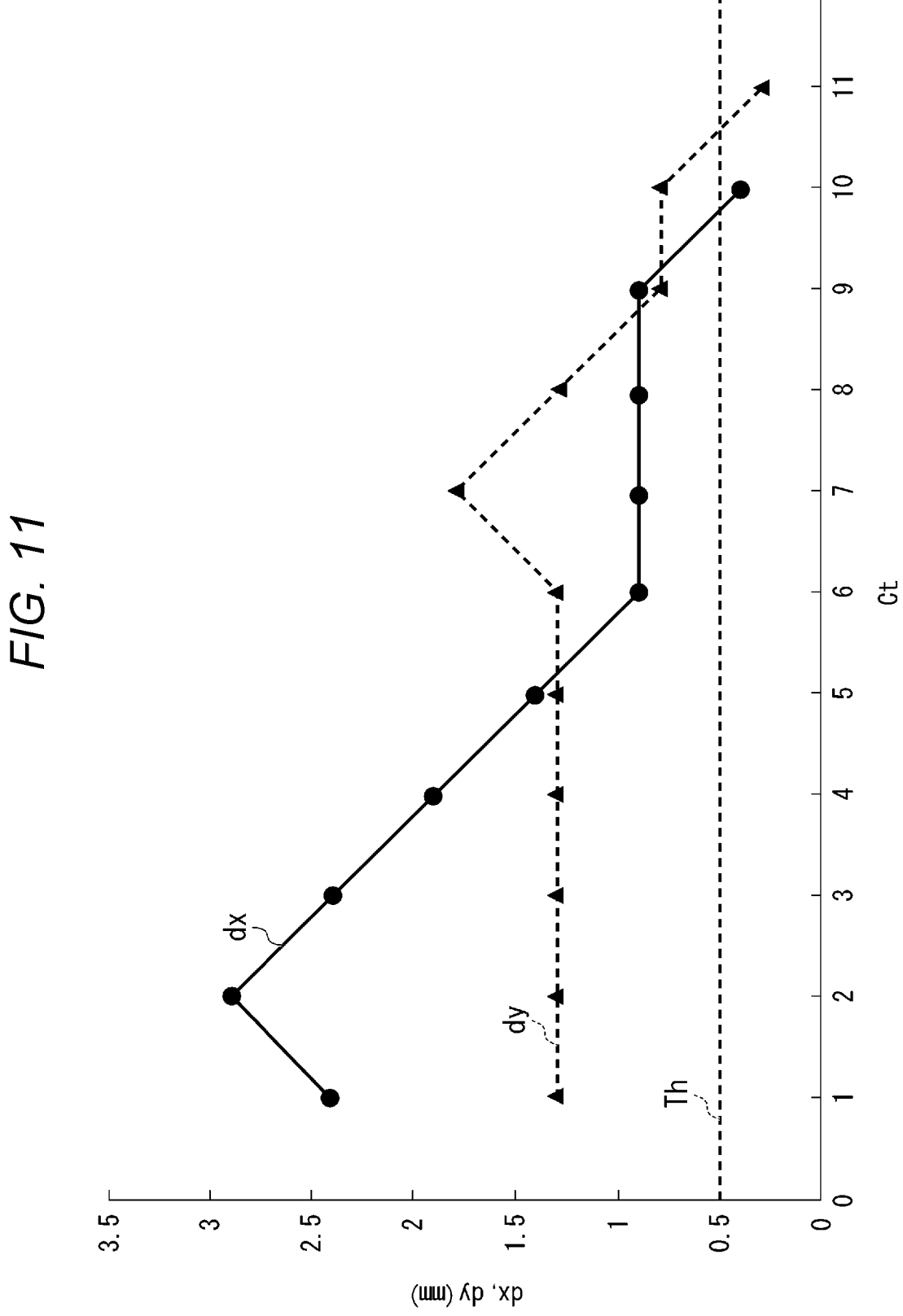
FIG. 11 is a graph showing the third action example.

A third action example of the projection system 1 will be described below with reference to FIGS. 10 and 11. FIG. 10 is a table showing the third action example of the projection system 1. FIG. 11 is a graph showing the third action example. The horizontal axis of FIG. 11 represents the value of Ct described in FIG. 10, and the vertical axis of FIG. 11 represents the values of the amount of X-axis shift dx and the amount of Y-axis shift dy described in FIG. 10. It is assumed also in the third action example that the threshold Th and the unit amount of displacement are each set at 0.5 (mm), as in the first action example.

3-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 2.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 2.4 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to the third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

The process described above is the end of the first pixel shift correction.

3-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 2.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links the amount of X-axis shift dx temporarily saved in the first memory 60A with the value of the first count variable nx and saves the result in the first memory 60A (step S12). That is, 2.9 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 2.9 (mm), and the previous value dx(1) of the amount of X-axis shift dx is 2.4 (mm). In this case, the current value dx(2) of the amount of X-axis shift dx is greater than the previous value dx(1) of the amount of X-axis shift dx, so that Conditional Expression (1) is not satisfied. The first processing apparatus 70A therefore determines that Conditional Expression (1) is not satisfied (No in step S15), and transitions to step S16.

Upon the transition to step S16, the first processing apparatus 70A evaluates whether the first image 100A was moved when the previous X-axis correction was performed (step S16). The first image 100A was moved toward the positive end of the X direction when the previous X-axis correction was performed. The first processing apparatus 70A therefore determines that the first image 100A was moved when the previous X-axis correction was performed (Yes in step S16), and moves the first image 100A by 0.5 (mm) in the opposite direction of the previous shift direction, that is, in the X direction toward the negative end thereof (step S17).

The process of step S17 moves the first image 100A from the third position to the fifth position separate therefrom by 0.5 (mm) toward the negative end of the X direction. That is, the process of step S17 is in other words the process in which the first processing apparatus 70A moves the first image 100A from the third position to the fifth position separate therefrom by 0.5 (mm) toward the negative end of the X direction. The position separate from the first position by 0.5 (mm) toward the positive end of the X direction is the third position, and the position separate from the third position by 0.5 (mm) toward the negative end of the X direction is the fifth position. As a result, the fifth position coincides with the first position.

3-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the fifth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the third pixel shift correction provides 2.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 2.4 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 2.4 (mm), and the previous value dx(2) of the amount of X-axis shift dx is 2.9 (mm). In this case, since the current value dx(3) of the amount of X-axis shift dx is smaller than the previous value dx(2) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "3", the previous value dx(2) of the amount of X-axis shift dx is 2.9 (mm), and the value preceding the previous value dx(1) of the amount of X-axis shift dx is 2.4 (mm). In this case, since the previous value dx(2) of the amount of X-axis shift dx is greater than the value preceding the previous value dx(1) of the amount of X-axis shift dx, Conditional Expression (2) is satisfied. The first processing apparatus 70A therefore determines that Conditional Expression (2) is satisfied (Yes in step S19), and transitions to step S20.

Upon the transition to step S20, the first processing apparatus 70A evaluates whether the first image 100A was moved when the previous X-axis correction was performed (step S20). The first image 100A was moved toward the negative end of the X direction when the previous X-axis correction was performed. The first processing apparatus 70A therefore determines that the first image 100A was moved when the previous X-axis correction was performed (Yes in step S20), and moves the first image 100A by 0.5 (mm) in the same direction as the previous shift direction, that is, in the X direction toward the negative end thereof (step S21).

The process of step S21 moves the first image 100A from the fifth position to the sixth position separate therefrom by 0.5 (mm) toward the negative end of the X direction. That is, the process of step S21 is in other words the process in which the first processing apparatus 70A moves the first image 100A from the fifth position to the sixth position separate therefrom by 0.5 (mm) toward the negative end of the X direction.

The process described above is the end of the third pixel shift correction.

3-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the sixth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 1.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "4" at this point.

The first processing apparatus 70A subsequently links the amount of X-axis shift dx temporarily saved in the first memory 60A with the value of the first count variable nx and saves the result in the first memory 60A (step S12). That is, 1.9 (mm), which is the value of the amount of X-axis shift dx, is linked with "4", which is the value of the first count variable nx, and saved in the first memory 60A.

The first processing apparatus 70A subsequently evaluates whether the value of the first count variable nx is "1" (step S13). Since the value of the first count variable nx is "4" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(4) of the amount of X-axis shift dx is 1.9 (mm), and the previous value dx(3) of the amount of X-axis shift dx is 2.4 (mm). In this case, since the current value dx(4) of the amount of X-axis shift dx is smaller than the previous value dx(3) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "4", the previous value dx(3) of the amount of X-axis shift dx is 2.4 (mm), and the value preceding the previous value dx(2) of the amount of X-axis shift dx is 2.9 (mm). In this case, since the previous value dx(3) of the amount of X-axis shift dx is smaller than the value preceding the previous value dx(2) of the amount of X-axis shift dx, Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The first image 100A was moved toward the negative end of the X direction when the previous X-axis correction was performed. The first processing apparatus 70A therefore determines that the first image 100A was moved when the previous X-axis correction was performed (Yes in step S23), and moves the second image 100B by 0.5 (mm) in the opposite direction of the previous shift direction, that is, in the X direction toward the positive end thereof (step S24).

The process of step S24 moves the second image 100B from the second position to the seventh position separate therefrom by 0.5 (mm) toward the positive end of the X direction. That is, the process of step S24 is in other words the process in which the first processing apparatus 70A moves the second image 100B from the second position to the seventh position separate therefrom by 0.5 (mm) toward the positive end of the X direction.

The process described above is the end of the fourth pixel shift correction.

3-5. Fifth Pixel Shift Correction (Ct=5)

Upon the start of the fifth pixel shift correction, the first processing apparatus 70A first acquires a captured image of the projection surface 200 from the camera 80 (step S1). More specifically, in step S1 of the fifth pixel shift correction, the first processing apparatus 70A acquires a captured image from the camera 80 by causing the camera 80 to capture an image of the projection surface 200 with the first image 100A projected by the first projector 10A at the sixth position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the fifth pixel shift correction provides 1.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "5" at this point.

The first processing apparatus 70A subsequently links the amount of X-axis shift dx temporarily saved in the first memory 60A with the value of the first count variable nx and saves the result in the first memory 60A (step S12). That is, 1.4 (mm), which is the value of the amount of X-axis shift dx, is linked with "5", which is the value of the first count variable nx, and saved in the first memory 60A.

The first processing apparatus 70A subsequently evaluates whether the value of the first count variable nx is "1" (step S13). Since the value of the first count variable nx is "5" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(5) of the amount of X-axis shift dx is 1.4 (mm), and the previous value dx(4) of the amount of X-axis shift dx is 1.9 (mm). In this case, since the current value dx(5) of the amount of X-axis shift dx is smaller than the previous value dx(4) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "5", the previous value dx(4) of the amount of X-axis shift dx is 1.9 (mm), and the value preceding the previous value dx(3) of the amount of X-axis shift dx is 2.4 (mm). In this case, since the previous value dx(4) of the amount of X-axis shift dx is smaller than the value preceding the previous value dx(3) of the amount of X-axis shift dx, Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The second image 100B was moved toward the positive end of the X direction when the previous X-axis correction was performed. The first processing apparatus 70A therefore determines that the second image 100B was moved when the previous X-axis correction was performed (No in step S23), and moves the first image 100A by 0.5 (mm) in the opposite direction of the previous shift direction, that is, in the X direction toward the negative end thereof (step S25).

The process of step S25 moves the first image 100A from the sixth position to a tenth position separate therefrom by 0.5 (mm) toward the negative end of the X direction. That is, the process of step S24 is in other words the process in which the first processing apparatus 70A moves the first image 100A from the sixth position to the tenth position separate therefrom by 0.5 (mm) toward the negative end of the X direction.

The process described above is the end of the fifth pixel shift correction.

3-6. Sixth Pixel Shift Correction (Ct=6)

Upon the start of the sixth pixel shift correction, the first processing apparatus 70A first acquires a captured image of the projection surface 200 from the camera 80 (step S1). More specifically, in step S1 of the sixth pixel shift correction, the first processing apparatus 70A acquires a captured image from the camera 80 by causing the camera 80 to capture an image of the projection surface 200 with the first image 100A projected by the first projector 10A at the tenth position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the sixth pixel shift correction provides 0.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs the Y-axis correction (step S6).

Upon the start of the Y-axis correction, the first processing apparatus 70A first increments the value of the second count variable ny (step S31). The value of the second count variable ny is "1" at this point.

The first processing apparatus 70A subsequently links the amount of Y-axis shift dy temporarily saved in the first memory 60A with the value of the second count variable ny and saves the result in the first memory 60A (step S32). That is, 1.3 (mm), which is the value of the amount of Y-axis shift dy, is linked with "1", which is the value of the second count variable ny, and saved in the first memory 60A.

The first processing apparatus 70A subsequently evaluates whether the value of the second count variable ny is "1" (step S33). Since the value of the second count variable ny is "1" at this point, the first processing apparatus 70A determines that the value of the second count variable ny is "1" (Yes in step S33), and transitions to step S34.

Upon the transition to step S34, the first processing apparatus 70A moves the first image 100A by 0.5 (mm) toward the positive end of Y direction (step S34). The process of step S34 moves the first image 100A from the tenth position to an eleventh position separate therefrom by 0.5 (mm) toward the positive end of the Y direction. That is, the process of step S34 is in other words the process in which the first processing apparatus 70A moves the first image 100A from the tenth position to the eleventh position separate therefrom by 0.5 (mm) toward the positive end of the Y direction.

The process described above is the end of the sixth pixel shift correction.

3-7. Seventh Pixel Shift Correction (Ct=7)

Upon the start of the seventh pixel shift correction, the first processing apparatus 70A first acquires a captured image of the projection surface 200 from the camera 80 (step S1). More specifically, in step S1 of the seventh pixel shift correction, the first processing apparatus 70A acquires a captured image from the camera 80 by causing the camera 80 to capture an image of the projection surface 200 with the first image 100A projected by the first projector 10A at the eleventh position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). It is assumed that step S2 of the seventh pixel shift correction provides 0.9 (mm) as the amount of X-axis shift dx and 1.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs the Y-axis correction (step S6).

Upon the start of the Y-axis correction, the first processing apparatus 70A first increments the value of the second count variable ny (step S31). The value of the second count variable ny is "2" at this point.

The first processing apparatus 70A subsequently links the amount of Y-axis shift dy temporarily saved in the first memory 60A with the value of the second count variable ny and saves the result in the first memory 60A (step S32). That is, 1.8 (mm), which is the value of the amount of Y-axis shift dy, is linked with "2", which is the value of the second count variable ny, and saved in the first memory 60A.

The first processing apparatus 70A subsequently evaluates whether the value of the second count variable ny is "1" (step S33). Since the value of the second count variable ny is "2" at this point, the first processing apparatus 70A determines that the value of the second count variable ny is not "1" (No in step S33), and transitions to step S35.

Upon the transition to step S35, the first processing apparatus 70A evaluates whether Conditional Expression (3) described above is satisfied (step S35). At this point, the current value dy(2) of the amount of Y-axis shift dy is 1.8 (mm), and the previous value dy(1) of the amount of Y-axis shift dy is 1.3 (mm). In this case, since the current value dy(2) of the amount of Y-axis shift dy is greater than the previous value dy(1) of the amount of Y-axis shift dy, Conditional Expression (3) is not satisfied. The first processing apparatus 70A therefore determines that Conditional Expression (3) is not satisfied (No in step S35), and transitions to step S36.

Upon the transition to step S36, the first processing apparatus 70A evaluates whether the first image 100A was moved when the previous Y-axis correction was performed (step S36). The first image 100A was moved toward the positive end of the Y direction when the previous Y-axis correction was performed. The first processing apparatus 70A therefore determines that the first image 100A was moved when the previous Y-axis correction was performed (Yes in step S36), and moves the first image 100A by 0.5 (mm) in the opposite direction of the previous shift direction, that is, in the Y direction toward the negative end thereof (step S37).

The process of step S37 moves the first image 100A from the eleventh position to a twelfth position separate therefrom by 0.5 (mm) toward the negative end of the Y direction. That is, the process of step S37 is in other words the process in which the first processing apparatus 70A moves the first image 100A from the eleventh position to the twelfth position separate therefrom by 0.5 (mm) toward the negative end of the Y direction. The position separate from the tenth position by 0.5 (mm) toward the positive end of the Y direction is the eleventh position, and the position separate from the eleventh position by 0.5 (mm) toward the negative end of the Y direction is the twelfth position. As a result, the twelfth position coincides with the tenth position.

The process described above is the end of the seventh pixel shift correction.

3-8. Eighth Pixel Shift Correction (Ct=8)

Upon the start of the eighth pixel shift correction, the first processing apparatus 70A first acquires a captured image of the projection surface 200 from the camera 80 (step S1). More specifically, in step S1 of the eighth pixel shift correction, the first processing apparatus 70A acquires a captured image from the camera 80 by causing the camera 80 to capture an image of the projection surface 200 with the first image 100A projected by the first projector 10A at the twelfth position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the eighth pixel shift correction provides 0.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs the Y-axis correction (step S6).

Upon the start of the Y-axis correction, the first processing apparatus 70A first increments the value of the second count variable ny (step S31). The value of the second count variable ny is "3" at this point.

The first processing apparatus 70A subsequently links the amount of Y-axis shift dy temporarily saved in the first memory 60A with the value of the second count variable ny and saves the result in the first memory 60A (step S32). That is, 1.3 (mm), which is the value of the amount of Y-axis shift dy, is linked with "3", which is the value of the second count variable ny, and saved in the first memory 60A.

The first processing apparatus 70A subsequently evaluates whether the value of the second count variable ny is "1" (step S33). Since the value of the second count variable ny is "3" at this point, the first processing apparatus 70A determines that the value of the second count variable ny is not "1" (No in step S33), and transitions to step S35.

Upon the transition to step S35, the first processing apparatus 70A evaluates whether Conditional Expression (3) described above is satisfied (step S35). At this point, the current value dy(3) of the amount of Y-axis shift dy is 1.3 (mm), and the previous value dy(2) of the amount of Y-axis shift dy is 1.8 (mm). In this case, since the current value dy(3) of the amount of Y-axis shift dy is smaller than the previous value dy(2) of the amount of Y-axis shift dy, Conditional Expression (3) is satisfied. The first processing apparatus 70A therefore determines that Conditional Expression (3) is satisfied (Yes in step S35), and transitions to step S39.

Upon the transition to step S39, the first processing apparatus 70A evaluates whether Conditional Expression (4) described above is satisfied (step S39). At this point, the value of the second count variable ny is "3", the previous value dy(2) of the amount of Y-axis shift dy is 1.8 (mm), and the value preceding the previous value dy(1) of the amount of Y-axis shift dy is 1.3 (mm). In this case, since the previous value dy(2) of the amount of Y-axis shift dy is greater than the value preceding the previous value dy(1) of the amount of Y-axis shift dy, Conditional Expression (4) is satisfied. The first processing apparatus 70A therefore determines that Conditional Expression (4) is satisfied (Yes in step S39), and transitions to step S40.

Upon the transition to step S40, the first processing apparatus 70A evaluates whether the first image 100A was moved when the previous Y-axis correction was performed (step S40). The first image 100A was moved toward the negative end of the Y direction when the previous Y-axis correction was performed. The first processing apparatus 70A therefore determines that the first image 100A was moved when the previous Y-axis correction was performed (Yes in step S40), and moves the first image 100A by 0.5 (mm) in the same direction as the previous shift direction, that is, in the Y direction toward the negative end thereof (step S41).

The process of step S41 moves the first image 100A from the twelfth position to a thirteenth position separate therefrom by 0.5 (mm) toward the negative end of the Y direction. That is, the process of step S41 is in other words the process in which the first processing apparatus 70A moves the first image 100A from the twelfth position to the thirteenth position separate therefrom by 0.5 (mm) toward the negative end of the Y direction.

The process described above is the end of the eighth pixel shift correction.

3-9. Ninth Pixel Shift Correction (Ct=9)

Upon the start of the ninth pixel shift correction, the first processing apparatus 70A first acquires a captured image of the projection surface 200 from the camera 80 (step S1). More specifically, in step S1 of the ninth pixel shift correction, the first processing apparatus 70A acquires a captured image from the camera 80 by causing the camera 80 to capture an image of the projection surface 200 with the first image 100A projected by the first projector 10A at the thirteenth position on the projection surface 200 and the second image 100B projected by the second projector 10B at the seventh position on the projection surface 200.

The first processing apparatus 70A subsequently calculates the amount of X-axis shift dx and the amount of Y-axis shift dy in the overlapping region 110 based on the captured image (step S2). Step S2 of the ninth pixel shift correction provides 0.9 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "6" at this point.

The first processing apparatus 70A subsequently links the amount of X-axis shift dx temporarily saved in the first memory 60A with the value of the first count variable nx and saves the result in the first memory 60A (step S12). That is, 0.9 (mm), which is the value of the amount of X-axis shift dx, is linked with "6", which is the value of the first count variable nx, and saved in the first memory 60A.

The first processing apparatus 70A subsequently evaluates whether the value of the first count variable nx is "1" (step S13). Since the value of the first count variable nx is "6" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(6) of the amount of X-axis shift dx is 0.9 (mm), and the previous value dx(5) of the amount of X-axis shift dx is 1.4 (mm). In this case, since the current value dx(6) of the amount of X-axis shift dx is smaller than the previous value dx(5) of the amount of X-axis shift dx, Conditional Expression (1) is satisfied. The first processing apparatus 70A therefore determines that Conditional Expression (1) is satisfied (Yes in step S15), and transitions to step S19.

Upon the transition to step S19, the first processing apparatus 70A evaluates whether Conditional Expression (2) described above is satisfied (step S19). At this point, the value of the first count variable nx is "6", the previous value dx(5) of the amount of X-axis shift dx is 1.4 (mm), and the value preceding the previous value dx(4) of the amount of X-axis shift dx is 1.9 (mm). In this case, since the previous value dx(5) of the amount of X-axis shift dx is smaller than the value preceding the previous value dx(4) of the amount of X-axis shift dx, Conditional Expression (2) is not satisfied. The first processing apparatus 70A therefore determines that Conditional Expression (2) is not satisfied (No in step S19), and transitions to step S23.

Upon the transition to step S23, the first processing apparatus 70A evaluates whether the first image 100A was moved when the previous X-axis correction was performed (step S23). The first image 100A was moved toward the negative end of the X direction when the previous X-axis correction was performed. The first processing apparatus 70A therefore determines that the first image 100A was moved when the previous X-axis correction was performed (Yes in step S23), and moves the second image 100B by 0.5 (mm) in the opposite direction of the previous shift direction, that is, in the X direction toward the positive end thereof (step S24).

The process of step S24 moves the second image 100B from the seventh position to a fourteenth position separate therefrom by 0.5 (mm) toward the positive end of the X direction. That is, the process of step S24 is in other words the process in which the first processing apparatus 70A moves the second image 100B from the seventh position to the fourteenth position separate therefrom by 0.5 (mm) toward the positive end of the X direction.

The process described above is the end of the ninth pixel shift correction.

3-10. Tenth Pixel Shift Correction (Ct=10)

Upon the start of the tenth pixel shift correction, the first processing apparatus 70A first acquires a captured image of the projection surface 200 from the camera 80 (step S1). More specifically, in step S1 of the tenth pixel shift correction, the first processing apparatus 70A acquires a captured image from the camera 80 by causing the camera 80 to capture an image of the projection surface 200 with the first image 100A projected by the first projector 10A at the thirteenth position on the projection surface 200 and the second image 100B projected by the second projector 10B at the fourteenth position on the projection surface 200.

The first processing apparatus 70A subsequently calculates the amount of X-axis shift dx and the amount of Y-axis shift dy in the overlapping region 110 based on the captured image (step S2). Step S2 of the tenth pixel shift correction provides 0.4 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of Y-axis shift dy is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs the Y-axis correction (step S6).

Upon the start of the Y-axis correction, the first processing apparatus 70A first increments the value of the second count variable ny (step S31). The value of the second count variable ny is "4" at this point.

The first processing apparatus 70A subsequently links the amount of Y-axis shift dy temporarily saved in the first memory 60A with the value of the second count variable ny and saves the result in the first memory 60A (step S32). That is, 0.8 (mm), which is the value of the amount of Y-axis shift dy, is linked with "4", which is the value of the second count variable ny, and saved in the first memory 60A.

The first processing apparatus 70A subsequently evaluates whether the value of the second count variable ny is "1" (step S33). Since the value of the second count variable ny is "4" at this point, the first processing apparatus 70A determines that the value of the second count variable ny is not "1" (No in step S33), and transitions to step S35.

Upon the transition to step S35, the first processing apparatus 70A evaluates whether Conditional Expression (3) described above is satisfied (step S35). At this point, the current value dy(4) of the amount of Y-axis shift dy is 0.8 (mm), and the previous value dy(3) of the amount of Y-axis shift dy is 1.3 (mm). In this case, since the current value dy(4) of the amount of Y-axis shift dy is smaller than the previous value dy(3) of the amount of Y-axis shift dy, Conditional Expression (3) is satisfied. The first processing apparatus 70A therefore determines that Conditional Expression (3) is satisfied (Yes in step S35), and transitions to step S39.

Upon the transition to step S39, the first processing apparatus 70A evaluates whether Conditional Expression (4) described above is satisfied (step S39). At this point, the value of the second count variable ny is "4", the previous value dy(3) of the amount of Y-axis shift dy is 1.3 (mm), and the value preceding the previous value dy(2) of the amount of Y-axis shift dy is 1.8 (mm). In this case, since the previous value dy(3) of the amount of Y-axis shift dy is smaller than the value preceding the previous value dy(2) of the amount of Y-axis shift dy, Conditional Expression (4) is not satisfied. The first processing apparatus 70A therefore determines that Conditional Expression (4) is not satisfied (No in step S39), and transitions to step S43.

Upon the transition to step S43, the first processing apparatus 70A evaluates whether the first image 100A was moved when the previous Y-axis correction was performed (step S43). The first image 100A was moved toward the negative end of the Y direction when the previous Y-axis correction was performed. The first processing apparatus 70A therefore determines that the first image 100A was moved when the previous Y-axis correction was performed (Yes in step S43), and moves the second image 100B by 0.5

(mm) in the opposite direction of the previous shift direction, that is, in the Y direction toward the positive end thereof (step S44).

The process of step S44 moves the second image 100B from the fourteenth position to a fifteenth position separate therefrom by 0.5 (mm) toward the positive end of the Y direction. That is, the process of step S44 is in other words the process in which the first processing apparatus 70A moves the second image 100B from the fourteenth position to the fifteenth position separate therefrom by 0.5 (mm) toward the positive end of the Y direction.

The process described above is the end of the tenth pixel shift correction.

3-11. Eleventh Pixel Shift Correction (Ct=11)

Upon the start of the eleventh pixel shift correction, the first processing apparatus 70A first acquires a captured image of the projection surface 200 from the camera 80 (step S1). More specifically, in step S1 of the eleventh pixel shift correction, the first processing apparatus 70A acquires a captured image from the camera 80 by causing the camera 80 to capture an image of the projection surface 200 with the first image 100A projected by the first projector 10A at the thirteenth position on the projection surface 200 and the second image 100B projected by the second projector 10B at the fifteenth position on the projection surface 200.

The first processing apparatus 70A subsequently calculates the amount of X-axis shift dx and the amount of Y-axis shift dy in the overlapping region 110 based on the captured image (step S2). Step S2 of the eleventh pixel shift correction provides 0.4 (mm) as the amount of X-axis shift dx and 0.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the eleventh pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60a, and then terminates the eleventh pixel shift correction.

The third action example has been described. As described above, in the third action example, in the period for which the pixel shift correction is performed eleven times, the X-axis correction is performed when the amount of X-axis shift dx is greater than the amount of Y-axis shift dy, whereas the Y-axis correction is performed when the amount of X-axis shift dx is smaller than the amount of Y-axis shift dy. In the thus configured present embodiment, alternately performing the X-axis correction and the Y-axis correction until the amount of X-axis shift dx and the amount of Y-axis shift dy are both smaller than the threshold Th allows early convergence of each of the amount of X-axis shift dx and the amount of Y-axis shift dy to a value smaller than the threshold Th.

Effects of First Embodiment

As described above, the projection image adjustment method according to the present embodiment includes acquiring the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquiring, based on the first captured image, the amount of X-axis shift dx along the X-axis between the first image 100A and the second image 100B as the first amount of shift, causing the first projector 10A to move the first image 100A from the first position to the third position separate therefrom by the unit amount of displacement toward the positive end of the X direction, acquiring the second captured image from the camera 80 by causing the camera 80 to capture an image of the projection surface 200 with the first image 100A projected by the first projector 10A at the third position and the second image 100B projected by the second projector 10B at the second position, acquiring, based on the second captured image, the amount of X-axis shift dx along the X-axis between the first image 100A and the second image 100B as the second amount of shift, and causing the second projector 10B to move the second image 100B from the second position to the fourth position separate therefrom by the unit amount of displacement toward the negative end of the X direction when the second amount of shift is smaller than the first amount of shift.

When the second amount of shift is smaller than the first amount of shift, it is speculated that the X direction toward the positive end thereof, in which the first image 100A was moved for the first time, is the direction in which the amount of X-axis shift dx decreases. Therefore, in this case, moving the second image 100B from the second position to the fourth position separate therefrom by the unit amount of displacement toward the negative end of the X direction, which is the opposite direction of the X direction toward the negative end thereof, can further reduce the amount of X-axis shift dx. As described above, the present embodiment allows correction of the pixel shift between the first image 100A and the second image 100B only with the aid of the known amount and direction of the relative pixel shift between the first image 100A and the second image 100B, which are projected to overlap with each other.

The projection image adjustment method according to the present embodiment further includes causing the first projector 10A to move the first image 100A from the third position to the fifth position separate by the unit amount of displacement toward the negative end of the X direction when the second amount of shift is greater than the first amount of shift.

When the second amount of shift is greater than the first amount of shift, it is speculated that the X direction toward the positive end thereof, in which the first image 100A was moved for the first time, is the direction in which the amount of X-axis shift dx increases. Therefore, in this case, moving the first image 100A from the third position to the fifth position separate therefrom by the unit amount of displacement in the X direction toward the negative end thereof, which is the opposite direction of the X direction toward the positive end thereof, can correct the wrong shift direction at an early stage and reduce the amount of X-axis shift dx.

The projection image adjustment method according to the present embodiment further includes acquiring the third captured image from the camera 80 by causing the camera 80 to capture an image of the projection surface with the first image projected by the first projector 10A at the fifth position and the second image projected by the second projector 10B at the second position, acquiring, based on the third captured image, the amount of X-axis shift dx along the X-axis between the first image 100A and the second image 100B as the third amount of shift, and causing the first projector 10A to move the first image 100A from the fifth position to the sixth position separate therefrom by the unit amount of displacement toward the negative end of the X direction when the third amount of shift is smaller than the second amount of shift.

In the present embodiment, immediately after moving the first image 100A from the third position to the fifth position, that is, correcting the wrong shift direction, the first image 100A is moved from the fifth position to the sixth position separate therefrom by the unit amount of displacement in the X direction toward the negative end thereof, which is the same direction as the previous shift direction. Therefore, even when moving the first image 100A from the third position to the fifth position does not adequately correct the wrong shift direction, moving the first image 100A from fifth position toward the negative end of the X direction can correct the wrong shift direction.

The projection image adjustment method according to the present embodiment further includes acquiring the fourth captured image from the camera 80 by causing the camera 80 to capture an image of the projection surface 200 with the first image 100A projected by the first projector 10A at the sixth position and the second image 100B projected by the second projector 10B at the second position, acquiring, based on the fourth captured image, the amount of X-axis shift dx along the X-axis between the first image 100A and the second image 100B as the fourth amount of shift, and causing the second projector 10B to move the second image 100B from the second position to the seventh position separate therefrom by the unit amount of displacement toward the positive end of the X direction when the fourth amount of shift is smaller than the third amount of shift.

When the fourth amount of shift is smaller than the third amount of shift, it is speculated that moving the first image 100A from the fifth position to the sixth position separate therefrom by the unit amount of displacement toward the negative end of the X direction reduces the amount of X-axis shift dx. Therefore, in this case, moving the second image 100B from the second position to the fourth position separate therefrom by the unit amount of displacement toward the positive end of the X direction can further reduce the amount of X-axis shift dx.

The projection image adjustment method according to the present embodiment further includes acquiring the amount of Y-axis shift dy along the Y-axis between the first image 100A and the second image 100B as the fifth amount of shift based on the first captured image before causing the first projector 10A to move the first image 100A from the first position to the third position, and when the first amount of shift is greater than the fifth amount of shift, the first image 100A is moved by the first projector 10A from the first position to the third position.

As described above, when the first amount of shift is greater than the fifth amount of shift, preferentially carrying out the process of reducing the larger first amount of shift, that is, moving the first image 100A from the first position to the third position can correct the pixel shift between the first image 100A and the second image 100B at an early stage.

In the projection image adjustment method according to the present embodiment, the position of the first image 100A projected onto the projection surface 200 changes in accordance with the position of the first projection lens 23A provided in the first projector 10A, and causing the first projector 10A to move the first image 100A from the first position to the third position includes changing the position of the first projection lens 23A to move the first image 100A from the first position to the third position.

As described above, the first image 100A can be moved by changing the position of the first projection lens 23A. The method for changing the position at which the first panel image is displayed in the display region of the first liquid crystal panel 22A, which will be described below, is suitable for moving the first image 100A on a full-pixel basis, whereas the method for changing the position of the first projection lens 23A is suitable for moving the first image 100A on a sub-pixel basis.

In the projection image adjustment method according to the present embodiment, the first image 100A corresponds to the first panel image displayed in the display region of the first liquid crystal panel 22A provided in the first projector 10A, and causing the first projector 10A to move the first image 100A from the first position to the third position includes changing the position where the first panel image is displayed in the display region of the first liquid crystal panel 22A to move the first image 100A from the first position to the third position.

As described above, changing the position where the first panel image is displayed in the display region of the first liquid crystal panel 22A can move the first image 100A even when the first projector 10A does not have the function of adjusting the position of the first projection lens 23A.

The projection system 1 according to the present embodiment includes the first projector 10A, which projects the first image 100A onto the projection surface 200, the second projector 10B, which projects the second image 100B onto the projection surface 200, and the camera 80, which captures an image of the projection surface 200, the first projector 10A includes the processing apparatus 70, which acquires the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquires, based on the first captured image, the amount of X-axis shift dx along the X-axis between the first image 100A and the second image 100B as the first amount of shift, causes the first projector 10A to move the first image 100A from the first position to the third position separate therefrom by the unit amount of displacement toward the positive end of the X direction, acquires the second captured image from the camera 80 by causing the camera 80 to capture an image of the projection surface 200 with the first image 100A projected by the first projector 10A at the third position and the second image 100B projected by the second projector 10B at the second position, acquires, based on the second captured image, the amount of X-axis shift dx along the X-axis between the first image 100A and the second image 100B as the second amount of shift, and causes the second projector 10B to move the second image 100B from the second position to the fourth position separate therefrom by the unit amount of displacement toward the negative end of the X direction when the second amount of shift is smaller than the first amount of shift.

The projection system 1 according to the present embodiment can correct the pixel shift between the first image 100A and the second image 100B only with the aid of the known amount and direction of the relative pixel shift between the first image 100A and the second image 100B, which are projected to overlap with each other.

The non-transitory computer-readable storage medium storing a program according to the present embodiment, causes a computer to acquire the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquire, based on the first captured image, the amount of X-axis shift dx along the X-axis between the first image 100A and the second image 100B as the first amount of shift, cause the first projector 10A to move the first image 100A from the first position to the third position separate therefrom by the unit amount of displacement toward the positive end of the X direction, acquire the second captured image from the camera 80 by causing the camera 80 to capture an image of the projection surface 200 with the first image 100A projected by the first projector 10A at the third position and the second image 100B projected by the second projector 10B at the second position, acquire, based on the second captured image, the amount of X-axis shift dx along the X-axis between the first image 100A and the second image 100B as the second amount of shift, and cause the second projector 10B to move the second image 100B from the second position to the fourth position separate therefrom by the unit amount of displacement toward the negative end of the X direction when the second amount of shift is smaller than the first amount of shift.

The non-transitory computer-readable storage medium storing a program according to the present embodiment can correct the pixel shift between the first image 100A and the second image 100B only with the aid of the known amount and direction of the relative pixel shift between the first image 100A and the second image 100B, which are projected to overlap with each other.

Second Embodiment

Figure 12:
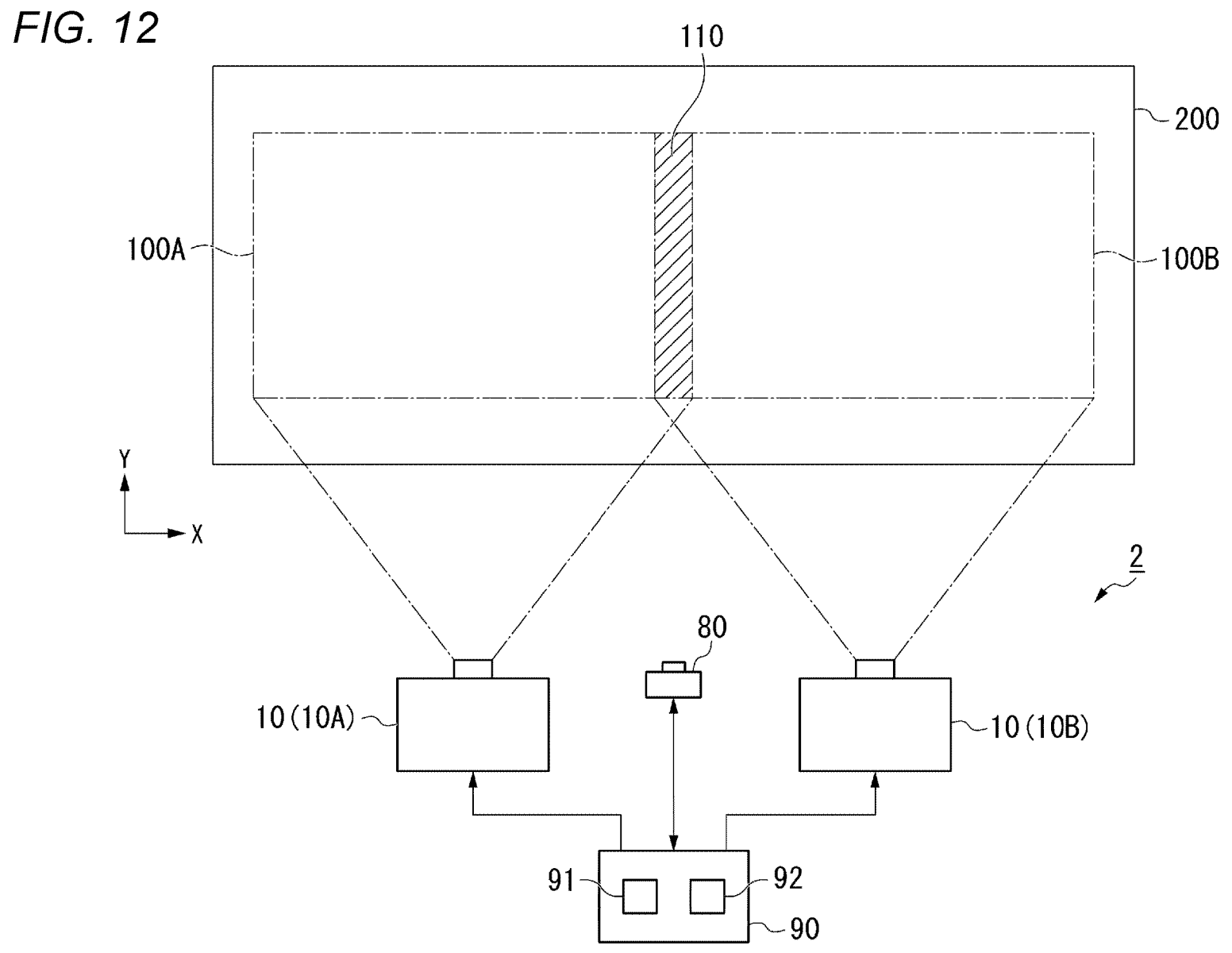

A second embodiment of the present disclosure will be described below. FIG. 12 shows a schematic configuration of a projection system 2 according to the second embodiment. The projection system 2 is a multi-projection system that displays a single image on the projection surface 200 by tiling a plurality of images projected from the plurality of projectors 10 onto the projection surface 200, as in the first embodiment. In the second embodiment presented below by way of example, the configurations common to those in the first embodiment have the same reference characters used in the first embodiment, and no detailed description of the common configurations will be made as appropriate.

The projection system 2 includes the first projector 10A, the second projector 10B, the camera 80, and an information processing apparatus 90. In the second embodiment, the first projector 10A, the second projector 10B, and the camera 80 each communicate with the information processing apparatus 90 in the form of wired or wireless communication. For example, the information processing apparatus 90 is a personal computer or a tablet terminal.

The information processing apparatus 90 includes at least a processing apparatus 91 and a memory 92. The information processing apparatus 90 includes a built-in circuit board that is not shown, such as a motherboard, and the processing apparatus 91 and the memory 92 are disposed on the circuit board. The circuit board further includes the following components disposed thereon: a connector for external connection that is not shown but is exposed through the enclosure of the information processing apparatus 90; a communication interface circuit that is not shown but is electrically coupled to the connector for external connection; and other components. On the circuit board, the processing apparatus 91, the memory 92, and the communication interface circuit are electrically coupled to each other via a bus or other wiring lines.

The memory 92 includes a nonvolatile memory that stores a program and a variety of setting data necessary for the processing apparatus 91 to carry out a variety of processes, and a volatile memory used as a temporary data saving destination when the processing apparatus 91 carries out the variety of processes. The nonvolatile memory is, for example, an EEPROM, a ROM, or a flash memory. The volatile memory is, for example, a RAM.

The processing apparatus 91 is a processor that carries out the variety of processes in accordance with the program stored in advance in the memory 92. As an example, the processing apparatus 91 is formed of one or more CPUs. Part or entirety of the functions of the processing apparatus 91 may be achieved by a circuit, such as a DSP, an ASIC, a PLD, and an FPGA. The processing apparatus 91 concurrently or successively carries out the variety of processes.

The processing apparatus 91 communicates with the first projector 10A, the second projector 10B, and the camera 80 via the communication interface circuit. The processing apparatus 91 performs the pixel shift correction in accordance with the program stored in advance in the memory 92. The pixel shift correction has been described in the first embodiment, and will therefore not be described in the second embodiment.

Effects of Second Embodiment

The information processing apparatus 90 according to the present embodiment includes the first projector 10A, which projects the first image 100A onto the projection surface 200, the second projector 10B, which projects the second image 100B onto the projection surface 200, and the camera 80, which captures an image of the projection surface 200, the first projector 10A includes the processing apparatus 91, which acquires the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquires, based on the first captured image, the amount of X-axis shift dx along the X-axis between the first image 100A and the second image 100B as the first amount of shift, causes the first projector 10A to move the first image 100A from the first position to the third position separate therefrom by the unit amount of displacement toward the positive end of the X direction, acquires the second captured image from the camera 80 by causing the camera 80 to capture an image of the projection surface 200 with the first image 100A projected by the first projector 10A at the third position and the second image 100B projected by the second projector 10B at the second position, acquires, based on the second captured image, the amount of X-axis shift dx along the X-axis between the first image 100A and the second image 100B as the second amount of shift, and causes the second projector 10B to move the second image 100B from the second position to the fourth position separate therefrom by the unit amount of displacement toward the negative end of the X direction when the second amount of shift is smaller than the first amount of shift.

The information processing apparatus 90 according to the present embodiment can correct the pixel shift between the first image 100A and the second image 100B only with the aid of the known amount and direction of the relative pixel shift between the first image 100A and the second image 100B, which are projected to overlap with each other.

The embodiments of the present disclosure have been described above, but the technical range of the present disclosure is not limited to the embodiments described above, and a variety of changes can be made thereto to the extent that the changes do not depart from the intent of the present disclosure.

The projection image adjustment method according to the embodiment described above includes causing the first projector 10A to move the first image 100A from the third position to the fifth position separate therefrom by the unit amount of displacement toward the negative end of the X direction when the second amount of shift is greater than the first amount of shift, but not necessarily in the present disclosure. In place of the step described above, the projection image adjustment method according to the embodiment described above may include causing the second projector 10B to move the second image 100B from the second position to the ninth position separate therefrom by the unit amount of displacement toward the positive end of the X direction when the second amount of shift is greater than the first amount of shift. The ninth position separate from the second position by the unit amount of displacement toward the positive end of the X direction is an example of the ninth position separate from the second position by a seventh distance in the first direction.

When the second amount of shift is greater than the first amount of shift, it is speculated that the X direction toward the positive end thereof, in which the first image 100A was moved for the first time, is the direction in which the pixel shift increases. Therefore, in this case, moving the second image 100B from the second position to the ninth position separate therefrom by the seventh distance toward the positive end of the X direction can correct the wrong shift direction at an early stage and hence reduce the pixel shift.

Steps S19 to S22 in FIG. 4 are not essential. Steps S19 to S22 may therefore be deleted. In this case, the first processing apparatus 70A directly transitions to step S23 when determining that the result of step S15 is "Yes". Similarly, steps S39 to S42 in FIG. 5 are not essential. Steps S39 to S42 may therefore be deleted. In this case, the first processing apparatus 70A directly transitions to step S43 when determining that the result of step S35 is "Yes".

For example, the aforementioned embodiments have presented by way of example the projection system 1 and 2 each including the two projectors 10, but not necessarily in the present disclosure, and the number of projectors 10 may be two or more.

The projection image adjustment method according to the aforementioned embodiments has been described by way of example with reference to the configuration using the unit amount of displacement, which is set at a value greater than or equal to the lower limit of the amount of pixel shift that can be calculated from the captured image as each of the first, second, third, fourth, fifth, sixth, and seventh distances, but not necessarily in the present disclosure. The values of the first to seventh distances may differ from each other. For example, the values may each be adjusted in accordance with a produced amount of X-axis shift dx or Y-axis shift dy.

SUMMARY OF PRESENT DISCLOSURE

The present disclosure will be summarized below as additional remarks.

Additional Remark 1

A projection image adjustment method including acquiring a first captured image from a camera by causing a camera to capture an image of a projection surface with a first image projected by a first projector at a first position on the projection surface and a second image projected by a second projector at a second position on the projection surface and at least partially overlapping with the first image, acquiring, based on the first captured image, a first amount of shift along a first axis between the first image and the second image, the first axis being a coordinate axis of a global coordinate system, causing the first projector to move the first image from the first position to a third position separate therefrom by a first distance in a first direction corresponding to the direction toward one end of the first axis, acquiring a second captured image from the camera by causing the camera to capture an image of the projection surface with the first image projected by the first projector at the third position and the second image projected by the second projector at the second position, acquiring, based on the second captured image, a second amount of shift along the first axis between the first image and the second image, and causing the second projector to move the second image from the second position to a fourth position separate therefrom by a second distance in a second direction that is the opposite direction of the first direction when the second amount of shift is smaller than the first amount of shift.

When the second amount of shift is smaller than the first amount of shift, it is speculated that the first direction, in which the first image was moved for the first time, is the direction in which the pixel shift between the first image and the second image decreases. Therefore, in this case, moving the second image from the second position to the fourth position separate therefrom by the second distance in the second direction, which is the opposite direction of the first direction, can further reduce the pixel shift. As described above, the projection image adjustment method described in the additional remark 1 can correct the pixel shift between the first image and the second image only with the aid of the known amount and direction of the relative pixel shift between the first image and the second image, which are projected to overlap with each other.

Additional Remark 2

The projection image adjustment method described in the additional remark 1, further including causing the first projector to move the first image from the third position to a fifth position separate therefrom by a third distance in the second direction when the second amount of shift is greater than the first amount of shift.

When the second amount of shift is greater than the first amount of shift, it is speculated that the first direction, in which the first image was moved for the first time, is the direction in which the pixel shift increases. Therefore, in this case, moving the first image from the third position to the fifth position separate therefrom by the third distance in the second direction, which is the opposite direction of the first direction, can correct the wrong shift direction at an early stage and hence reduce the pixel shift.

Additional Remark 3

The projection image adjustment method described in the additional remark 2, further including acquiring a third captured image from the camera by causing the camera to capture an image of the projection surface with the first image projected by the first projector at the fifth position and the second image projected by the second projector at the second position, acquiring, based on the third captured image, a third amount of shift along the first axis between the first image and the second image, and causing the first projector to move the first image from the fifth position to a sixth position separate therefrom by a fourth distance in the second direction when the third amount of shift is smaller than the second amount of shift.

As described above, immediately after moving the first image from the third position to the fifth position, that is, correcting the wrong shift direction, the first image is moved from the fifth position to the sixth position separate therefrom by the fourth distance in the second direction, which is the same direction as the previous shift direction. Therefore, even when moving the first image from the third position to the fifth position does not adequately correct the wrong shift direction, moving the first image from fifth position in the second direction can correct the wrong shift direction.

Additional Remark 4

The projection image adjustment method described in the additional remark 3, further including acquiring a fourth captured image from the camera by causing the camera to capture an image of the projection surface with the first image projected by the first projector at the sixth position and the second image projected by the second projector at the second position, acquiring, based on the fourth captured image, a fourth amount of shift along the first axis between the first image and the second image, and causing the second projector to move the second image from the second position to a seventh position separate therefrom by a fifth distance in the first direction when the fourth amount of shift is smaller than the third amount of shift.

When the fourth amount of shift is smaller than the third amount of shift, it is speculated that moving the first image from the fifth position to the sixth position reduces the pixel shift. Therefore, in this case, moving the second image from the second position to the seventh position separate therefrom by the fifth distance in the first direction can further reduce the pixel shift.

Additional Remark 5

The projection image adjustment method described in the additional remark 1, further including causing the second projector to move the second image from the second position to a ninth position separate therefrom by a seventh distance in the first direction when the second amount of shift is greater than the first amount of shift.

When the second amount of shift is greater than the first amount of shift, it is speculated that the first direction, in which the first image was moved for the first time, is the direction in which the pixel shift increases. Therefore, in this case, moving the second image from the second position to the ninth position separate therefrom by the seventh distance in the first direction can correct the wrong shift direction at an early stage and hence reduce the pixel shift.

Additional Remark 6

The projection image adjustment method described in the additional remark 1, which further includes acquiring a fifth amount of shift along a second axis between the first image and the second image, the second axis being perpendicular to the first axis, based on the first captured image before causing the first projector to move the first image from the first position to the third position, and in which the first projector moves the first image from the first position to the third position when the first amount of shift is greater than the fifth amount of shift.

As described above, when the first amount of shift is greater than the fifth amount of shift, preferentially carrying out the process of reducing the larger first amount of shift, that is, moving the first image from the first position to the third position can correct the pixel shift between the first image and the second image at an early stage.

Additional Remark 7

The projection image adjustment method described in any one of the additional remarks 1 to 6, in which the position of the first image projected onto the projection surface changes in accordance with the position of a first projection lens provided in the first projector, and causing the first projector to move the first image to the third position includes changing the position of the first projection lens to move the first image from the first position to the third position.

The first image can thus be moved by changing the position of the first projection lens.

Additional Remark 8

The projection image adjustment method described in any one of the additional remarks 1 to 6, in which the first image corresponds to a first panel image displayed in the display region of a first panel provided in the first projector, and causing the first projector to move the first image from the first position to the third position includes changing the position where the first panel image is displayed in the display region of the first panel to move the first image from the first position to the third position.

As described above, changing the position where the first panel image is displayed in the display region of the first panel can move the first image even when the first projector does not have the function of adjusting the position of the first projection lens.

Additional Remark 9

A projection system including a first projector that projects a first image onto a projection surface, a second projector that projects a second image onto the projection surface, and a camera that captures an image of the projection surface, the first projector including a processing apparatus that acquires a first captured image from the camera by causing the camera to capture an image of the projection surface with the first image projected by the first projector at a first position on the projection surface and the second image projected by the second projector at a second position on the projection surface and at least partially overlapping with the first image, acquires, based on the first captured image, a first amount of shift along a first axis between the first image and the second image, the first axis being a coordinate axis of a global coordinate system, causes the first projector to move the first image from the first position to a third position separate therefrom by a first distance in a first direction corresponding to the direction toward one end of the first axis, acquires a second captured image from the camera by causing the camera to capture an image of the projection surface with the first image projected by the first projector at the third position and the second image projected by the second projector at the second position, acquires, based on the second captured image, a second amount of shift along the first axis between the first image and the second image, and causes the second projector to move the second image from the second position to a fourth position separate therefrom by a second distance in a second direction that is the opposite direction of the first direction when the second amount of shift is smaller than the first amount of shift.

The projection system described in the additional remark 9 can correct the pixel shift between the first image and the second image only with the aid of the known amount and direction of the relative pixel shift between the first image and the second image, which are projected to overlap with each other.

Additional Remark 10

An information processing apparatus including a processing apparatus that acquires a first captured image from a camera by causing the camera to capture an image of a projection surface with a first image projected by a first projector at a first position on the projection surface and a second image projected by a second projector at a second position on the projection surface and at least partially overlapping with the first image, acquires, based on the first captured image, a first amount of shift along a first axis between the first image and the second image, the first axis being a coordinate axis of a global coordinate system, causes the first projector to move the first image from the first position to a third position separate therefrom by a first distance in a first direction corresponding to the direction toward one end of the first axis, acquires a second captured image from the camera by causing the camera to capture an image of the projection surface with the first image projected by the first projector at the third position and the second image projected by the second projector at the second position, acquires, based on the second captured image, a second amount of shift along the first axis between the first image and the second image, and causes the second projector to move the second image from the second position to a fourth position separate therefrom by a second distance in a second direction that is the opposite direction of the first direction when the second amount of shift is smaller than the first amount of shift.

The information processing apparatus described in the additional remark 10 can correct the pixel shift between the first image and the second image only with the aid of the known amount and direction of the relative pixel shift between the first image and the second image, which are projected to overlap with each other.

Additional Remark 11

A non-transitory computer-readable storage medium storing a program that causes a computer to acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, cause the first projector to move the first image from the first position to a third position separate therefrom by a first distance in a first direction corresponding to the direction toward one end of the first axis, acquire a second captured image from the camera by causing the camera to capture an image of the projection surface with the first image projected by the first projector at the third position and the second image projected by the second projector at the second position, acquire, based on the second captured image, a second amount of shift along the first axis between the first image and the second image, and cause the second projector to move the second image from the second position to a fourth position separate therefrom by a second distance in a second direction that is the opposite direction of the first direction when the second amount of shift is smaller than the first amount of shift.

The non-transitory computer-readable storage medium storing a program described in the additional remark 11 can correct the pixel shift between the first image and the second image only with the aid of the known amount and direction of the relative pixel shift between the first image and the second image, which are projected to overlap with each other.

What is claimed is:

1. A projection image adjustment method comprising:
acquiring a first captured image from a camera by causing the camera to capture an image of a projection surface with a first image projected by a first projector at a first position on the projection surface and a second image projected by a second projector at a second position on the projection surface and at least partially overlapping with the first image;
acquiring, based on the first captured image, a first amount of shift along a first axis between the first image and the second image, the first axis being a coordinate axis of a global coordinate system;
causing the first projector to move the first image from the first position to a third position separate therefrom by a first distance in a first direction corresponding to a direction toward one end of the first axis;
acquiring a second captured image from the camera by causing the camera to capture an image of the projection surface with the first image projected by the first projector at the third position and the second image projected by the second projector at the second position;
acquiring, based on the second captured image, a second amount of shift along the first axis between the first image and the second image; and
causing the second projector to move the second image from the second position to a fourth position separate therefrom by a second distance in a second direction that is an opposite direction of the first direction when the second amount of shift is smaller than the first amount of shift.

2. The projection image adjustment method according to claim 1, further comprising causing the first projector to move the first image from the third position to a fifth position separate therefrom by a third distance in the second direction when the second amount of shift is greater than the first amount of shift.

3. The projection image adjustment method according to claim 2, further comprising:
acquiring a third captured image from the camera by causing the camera to capture an image of the projection surface with the first image projected by the first projector at the fifth position and the second image projected by the second projector at the second position;
acquiring, based on the third captured image, a third amount of shift along the first axis between the first image and the second image; and
causing the first projector to move the first image from the fifth position to a sixth position separate therefrom by a fourth distance in the second direction when the third amount of shift is smaller than the second amount of shift.

4. The projection image adjustment method according to claim 3, further comprising:

acquiring a fourth captured image from the camera by causing the camera to capture an image of the projection surface with the first image projected by the first projector at the sixth position and the second image projected by the second projector at the second position;

acquiring, based on the fourth captured image, a fourth amount of shift along the first axis between the first image and the second image; and causing the second projector to move the second image from the second position to a seventh position separate therefrom by a fifth distance in the first direction when the fourth amount of shift is smaller than the third amount of shift.

5. The projection image adjustment method according to claim 1, further comprising causing the second projector to move the second image from the second position to a ninth position separate therefrom by a seventh distance in the first direction when the second amount of shift is greater than the first amount of shift.

6. The projection image adjustment method according to claim 1, further comprising acquiring a fifth amount of shift along a second axis between the first image and the second image, the second axis being perpendicular to the first axis, based on the first captured image before causing the first projector to move the first image from the first position to the third position, wherein the first projector moves the first image from the first position to the third position when the first amount of shift is greater than the fifth amount of shift.

7. The projection image adjustment method according to claim 1, wherein a position of the first image projected onto the projection surface changes in accordance with a position of a first projection lens provided in the first projector, and causing the first projector to move the first image to the third position includes changing the position of the first projection lens to move the first image from the first position to the third position.

8. The projection image adjustment method according to claim 1, wherein the first image corresponds to a first panel image displayed in a display region of a first panel provided in the first projector, and causing the first projector to move the first image from the first position to the third position includes changing a position where the first panel image is displayed in the display region of the first panel to move the first image from the first position to the third position.

9. An information processing apparatus comprising one or more processors that acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, cause the first projector to move the first image from the first position to a third position separate therefrom by a first distance in a first direction corresponding to a direction toward one end of the first axis, acquire a second captured image from the camera by causing the camera to capture an image of the projection surface with the first image projected by the first projector at the third position and the second image projected by the second projector at the second position, acquire, based on the second captured image, a second amount of shift along the first axis between the first image and the second image, and cause the second projector to move the second image from the second position to a fourth position separate therefrom by a second distance in a second direction that is an opposite direction of the first direction when the second amount of shift is smaller than the first amount of shift.

10. A non-transitory computer-readable storage medium storing a program that causes a computer to acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, cause the first projector to move the first image from the first position to a third position separate therefrom by a first distance in a first direction corresponding to a direction toward one end of the first axis, acquire a second captured image from the camera by causing the camera to capture an image of the projection surface with the first image projected by the first projector at the third position and the second image projected by the second projector at the second position, acquire, based on the second captured image, a second amount of shift along the first axis between the first image and the second image, and cause the second projector to move the second image from the second position to a fourth position separate therefrom by a second distance in a second direction that is an opposite direction of the first direction when the second amount of shift is smaller than the first amount of shift.

* * * * *